United States Patent
Jungmaier et al.

(10) Patent No.: US 11,662,430 B2
(45) Date of Patent: May 30, 2023

(54) MMWAVE RADAR TESTING

(71) Applicant: Infineon Technologies AG, Neubiberg (DE)

(72) Inventors: Reinhard-Wolfgang Jungmaier, Alkoven (AT); Saverio Trotta, Munich (DE); Dennis Noppeney, Cologne (DE)

(73) Assignee: Infineon Technologies AG, Neubiberg (DE)

( * ) Notice: Subject to any disclaimer, the term of this patent is extended or adjusted under 35 U.S.C. 154(b) by 239 days.

(21) Appl. No.: 17/204,640

(22) Filed: Mar. 17, 2021

(65) Prior Publication Data

US 2022/0299601 A1 Sep. 22, 2022

(51) Int. Cl.
*G01S 7/40* (2006.01)
*G01S 13/00* (2006.01)

(52) U.S. Cl.
CPC .......... *G01S 7/4095* (2021.05); *G01S 7/4021* (2013.01)

(58) Field of Classification Search
None
See application file for complete search history.

(56) References Cited

U.S. PATENT DOCUMENTS

| | | | |
|---|---|---|---|
| 3,341,849 A * | 9/1967 | Cordry | G01S 7/4056 342/128 |
| 4,145,692 A * | 3/1979 | Armstrong | G01S 7/4052 342/173 |
| 4,241,347 A | 12/1980 | Albanese et al. | |
| 5,969,667 A * | 10/1999 | Farmer | G01S 7/4056 342/194 |
| 6,147,572 A | 11/2000 | Kaminski et al. | |
| 6,414,631 B1 | 7/2002 | Fujimoto | |
| 6,636,174 B2 | 10/2003 | Arikan et al. | |

(Continued)

FOREIGN PATENT DOCUMENTS

| | | |
|---|---|---|
| CN | 1463161 A | 12/2003 |
| CN | 1716695 A | 1/2006 |

(Continued)

OTHER PUBLICATIONS

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.

(Continued)

*Primary Examiner* — Bernarr E Gregory
(74) *Attorney, Agent, or Firm* — Slater Matsil, LLP

(57) ABSTRACT

In an embodiment, a method for testing a millimeter-wave radar module includes: providing power to the millimeter-wave radar module; performing a plurality of tests indicative of a performance level of the millimeter-wave radar module; comparing respective results from the plurality of tests with corresponding test limits; and generating a flag when a result from a test of the plurality of test is outside the corresponding test limits, where performing the plurality of tests includes: transmitting a signal with a transmitting antenna coupled to a millimeter-wave radar sensor, modulating the transmitted signal with a test signal, and capturing first data from a first receiving antenna using an analog-to-digital converter of the millimeter-wave radar sensor, where generating the flag includes generating the flag based on the captured first data.

20 Claims, 15 Drawing Sheets

(56) References Cited

U.S. PATENT DOCUMENTS

| | | |
|---|---|---|
| 7,048,973 B2 | 5/2006 | Sakamoto et al. |
| 7,057,564 B2 | 6/2006 | Tsai et al. |
| 7,171,052 B2 | 1/2007 | Park |
| 7,317,417 B2 | 1/2008 | Arikan et al. |
| 7,596,241 B2 | 9/2009 | Rittscher et al. |
| 7,692,574 B2 | 4/2010 | Nakagawa |
| 7,873,326 B2 | 1/2011 | Sadr |
| 7,889,147 B2 | 2/2011 | Tam et al. |
| 7,973,701 B2 * | 7/2011 | Lohmeier ............ G01S 13/931 342/147 |
| 8,228,382 B2 | 7/2012 | Pattikonda |
| 8,497,805 B2 | 7/2013 | Rofougaran et al. |
| 8,659,369 B2 | 2/2014 | Rofougaran et al. |
| 8,694,276 B2 | 4/2014 | Sontakke et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,930,063 B2 * | 1/2015 | Gandhi ............... G01S 13/931 342/174 |
| 8,976,061 B2 | 3/2015 | Chowdhury |
| 9,172,132 B2 | 10/2015 | Kam et al. |
| 9,182,476 B2 | 11/2015 | Wintermantel |
| 9,202,105 B1 | 12/2015 | Wang et al. |
| 9,413,079 B2 | 8/2016 | Kamgaing et al. |
| 9,495,600 B2 | 11/2016 | Heu et al. |
| 9,886,095 B2 | 2/2018 | Pothier |
| 9,935,065 B1 | 4/2018 | Baheti et al. |
| 10,613,198 B2 | 4/2020 | Vacanti |
| 10,663,562 B2 | 5/2020 | McAleenan et al. |
| 10,795,012 B2 | 10/2020 | Santra et al. |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0210959 A1 | 9/2007 | Herd et al. |
| 2008/0106460 A1 | 5/2008 | Kurtz et al. |
| 2008/0238759 A1 | 10/2008 | Carocar et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0153428 A1 | 6/2009 | Rofougaran et al. |
| 2009/0315761 A1 | 12/2009 | Walter et al. |
| 2010/0207805 A1 | 8/2010 | Haworth |
| 2011/0299433 A1 | 12/2011 | Darabi et al. |
| 2012/0087230 A1 | 4/2012 | Guo et al. |
| 2012/0092284 A1 | 4/2012 | Rofougaran et al. |
| 2012/0116231 A1 | 5/2012 | Liao et al. |
| 2012/0195161 A1 | 8/2012 | Little et al. |
| 2012/0206339 A1 | 8/2012 | Dahl |
| 2012/0265486 A1 | 10/2012 | Klofer et al. |
| 2012/0268314 A1 | 10/2012 | Kuwahara et al. |
| 2012/0280900 A1 | 11/2012 | Wang et al. |
| 2013/0027240 A1 | 1/2013 | Chowdhury |
| 2013/0106673 A1 | 5/2013 | McCormack et al. |
| 2014/0028542 A1 | 1/2014 | Lovitt et al. |
| 2014/0070994 A1 | 3/2014 | Schmalenberg et al. |
| 2014/0145883 A1 | 5/2014 | Baks et al. |
| 2014/0324888 A1 | 10/2014 | Xie et al. |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0243575 A1 | 8/2015 | Strothmann et al. |
| 2015/0277569 A1 | 10/2015 | Sprenger et al. |
| 2015/0325925 A1 | 11/2015 | Kamgaing et al. |
| 2015/0346820 A1 | 12/2015 | Poupyrev et al. |
| 2015/0348821 A1 | 12/2015 | Iwanaga et al. |
| 2015/0364816 A1 | 12/2015 | Murugan et al. |
| 2016/0018511 A1 | 1/2016 | Nayyar et al. |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0098089 A1 | 4/2016 | Poupyrev |
| 2016/0103213 A1 | 4/2016 | Ikram et al. |
| 2016/0109566 A1 | 4/2016 | Liu et al. |
| 2016/0118353 A1 | 4/2016 | Ahrens et al. |
| 2016/0135655 A1 | 5/2016 | Ahn et al. |
| 2016/0146931 A1 | 5/2016 | Rao et al. |
| 2016/0146933 A1 | 5/2016 | Rao et al. |
| 2016/0178730 A1 | 6/2016 | Trotta et al. |
| 2016/0187462 A1 | 6/2016 | Altus et al. |
| 2016/0191232 A1 | 6/2016 | Subburaj et al. |
| 2016/0223651 A1 | 8/2016 | Kamo et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1 | 9/2016 | Molchanov et al. |
| 2016/0266233 A1 | 9/2016 | Mansour |
| 2016/0269815 A1 | 9/2016 | Liao et al. |
| 2016/0291130 A1 | 10/2016 | Ginsburg et al. |
| 2016/0299215 A1 | 10/2016 | Dandu et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0327633 A1 | 11/2016 | Kumar et al. |
| 2016/0334502 A1 | 11/2016 | Ali et al. |
| 2016/0349845 A1 | 12/2016 | Poupyrev et al. |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0141453 A1 | 5/2017 | Waelde et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0364160 A1 | 12/2017 | Malysa et al. |
| 2018/0046255 A1 | 2/2018 | Rothera et al. |
| 2018/0071473 A1 | 3/2018 | Trotta et al. |
| 2018/0101239 A1 | 4/2018 | Fin et al. |
| 2021/0086915 A1 * | 3/2021 | Qin .......................... G01S 7/40 |

FOREIGN PATENT DOCUMENTS

| | | | |
|---|---|---|---|
| CN | 101490578 A | 7/2009 | |
| CN | 101585361 A | 11/2009 | |
| CN | 102788969 A | 11/2012 | |
| CN | 102967854 A | 3/2013 | |
| CN | 103529444 A | 1/2014 | |
| CN | 203950036 U | 11/2014 | |
| CN | 109471076 A | 3/2019 | |
| DE | 102008054570 A1 | 6/2010 | |
| DE | 102011100907 A1 | 1/2012 | |
| DE | 102011075725 A1 | 11/2012 | |
| DE | 102014118063 A1 | 7/2015 | |
| EP | 2911027 A2 * | 8/2015 | ........... G01S 7/4004 |
| EP | 3296760 A1 | 9/2017 | |
| GB | 2247799 A | 3/1992 | |
| GB | 2259778 A * | 3/1993 | ........... G01S 7/4017 |
| JP | 2001174539 A | 6/2001 | |
| JP | 2004198312 A | 7/2004 | |
| JP | 2005265535 A | 9/2005 | |
| JP | 2005265535 A * | 9/2005 | ............... G01S 7/40 |
| JP | 2006234513 A | 9/2006 | |
| JP | 2008029025 A | 2/2008 | |
| JP | 2008089614 A | 4/2008 | |
| JP | 2009069124 A | 4/2009 | |
| JP | 2011529181 A | 12/2011 | |
| JP | 2012112861 A | 6/2012 | |
| JP | 2013521508 A | 6/2013 | |
| JP | 2014055957 A | 3/2014 | |

(56) References Cited

FOREIGN PATENT DOCUMENTS

| | | |
|---|---|---|
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chioukh, Lydia et al., "Noise and Sensitivity of Harmonic Radar Architecture for Remote Sensing and Detection of Vital Signs", IEEE Transactions on Microwave Theory and Techniques, vol. 62, No. 9, Sep. 2014, pp. 1847-1855.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://ap.physiology.org/content/jap/90/4/1441. full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gigie, Andrew et al., "Novel Approach for Vibration Detection Using Indented Radar", Progess in Electromagnetic Research C, vol. 87, pp. 147-162, Oct. 4, 2018.

Gouveia, Carolina et al., "A Review on Methods for Random Motion Detection and Compensation in Bio-Radar Systems", Sensors, MDPI, Jan. 31, 2019, 17 pages.

Gu, Changzhan et al., "Assessment of Human Respiration Patterns via Noncontact Sensing Using Doppler MultiRadar System", Sensors Mar. 2015,15(3), 6383-6398, doi: 10.3390/s150306383, 17 pages.

Gu, Changzhan et al., "Deep Neural Network based Body Movement Cancellation for Doppler Radar Vital Sign Detection", IEEE MTT-S International Wireless Symposium (IWS) May 19-22, 2019, 3 pages.

Gu, Changzhu "Short-Range Noncontact Sensors for Healthcare and Other Emerginng Applications: A Review", Sensors, MDPI, Jul. 26, 2016, 24 pages.

Gu, Changzhan et al., "From Tumor Targeting to Speed Monitoring", IEEE Microwave Magazine, ResearchGate, Jun. 2014, 11 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Hu, Wei et al., "Noncontact Accurate Measurement of Cardiopulmonary Activity Using a Compact Quadrature Doppler Radar Sensor", IEEE Transactions on Biomedical Engineering, vol. 61, No. 3, Mar. 2014, pp. 725-735.

Immoreev, I. Ya. "Ultrawideband Radars: Features and Capabilities", Journal of Communications Technology and Electronics, ISSN: 1064-2269, vol. 54, No. 1, Feb. 8, 2009, pp. 1-26.

Inac, Ozgur et al., "A Phased Array RFIC with Built-in Self-Test Capabilities," IEEE Transactions on Microwave Theory and Techniques, vol. 60, No. 1, Jan. 2012, 10 pages.

Killedar, Abdulraheem "XWRIxxx Power Management Optimizations - Low Cost LC Filter Solution," Application Report SWRA577, Texas Instruments, Oct. 2017,19 pages.

Kishore, N et al., "Millimeter Wave Antenna for Intelligent Transportation Systems Application", Journal of Microwaves, Optoelectronics and Electromagnetic Applications, vol. 17, No. 1, Mar. 2018, pp. 171-178.

Kizhakkel, V., "Pulsed Radar Target Recognition Based on Micro-Doppler Signatures Using Wavelet Analysis", A Thesis, Graduate Program in Electrical and Computer Engineering, Ohio State University, January 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Li, Changzhi et al., "A Review on Recent Advances in Doppler Radar Sensors for Noncontact Healthcare Monitoring", IEEE Transactions on Microwave Theory and Techniques, vol. 61, No. 5, May 2013, pp. 2046-2060.

Li, Changzhi et al., "A Review on Recent Progress of Portable Short-Range Noncontact Microwave Radar Systems", IEEE Transactions on Microwave Theory and Techniques, vol. 65, No. 5, May 2017, pp. 1692-1706.

Li, Changzhi et al., "Random Body Movement Cancellation in Doppler Radar Vital Sign Detection", IEEE Transactions on Microwave Theory and Techniques, vol. 56, No. 12, Dec. 2008, pp. 3143-3152.

Li, Changzhi et al., "Robust Overnight Monitoring of Human Vital Signs by a Non-contact Respiration and Heartbeat Detector", IEEE Proceedings of the 28th EMBS Annual International Conference, FrA05.5, Aug. 30-Sep. 3, 2006, 4 pages.

Li, Changzhi "Vital-sign monitoring on the go", Sensors news and views, www.nature.com/naturelectronics, Nature Electronics, vol. 2, Jun. 2019, 2 pages.

Lim, Soo-Chui et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/joumal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Massagram, Wansuree et al., "Assessment of Heart Rate Variability and Respiratory Sinus Arrhythmia via Doppler Radar", IEEE Transactions on Microwave Theory and Techniques, vol. 57, No. 10, Oct. 2009, pp. 2542-2549.

Mercuri, Marco et al., "Vital-sign monitoring and spatial tracking of multiple people using a contactless radar-based sensor", Nature Electronics, vol. 2, Articles, https://doi.org/10.1038/s41928-019-0258-6, Jun. 2019, 13 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Mostov, K., et al., "Medical applications of shortwave FM radar: Remote monitoring of cardiac and respiratory motion", Am. Assoc. Phys. Med., 37(3), Mar. 2010, pp. 1332-1338.

Oguntala, G et al., "Indoor location identification technologies for real-time IoT-based applications: an inclusive survey", Elsevier Inc., http://hdl.handle.net/10454/16634, Oct. 2018, 42 pages.

(56) References Cited

OTHER PUBLICATIONS

Peng, Zhengyu et al., "A Portable FMCW Interferometry Radar with Programmable Low-IF Architecture for Localization, ISAR Imaging, and Vial Sign Tracking", IEEE Transactions on Microwave Theory and Techniques, Dec. 15, 2016, 11 pages.
Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.
Richards, Mark A., "Fundamentals of Radar Signal Processing," McGraw Hill Electronic Engineering, ISBN: 0-07-144474-2, Jun. 2005, 93 pages.
Sakamoto, Takuya et al., "Feature-Based Correlation and Topological Similarity for Interbeat Interval Estimation Using Ultrawideband Radar", IEEE Transactions on Biomedical Engineering, vol. 63, No. 4, Apr. 2016, pp. 747-757.
Santra, Avik et al., "Short-range multi-mode continuous-wave radar for vital sign measurement and imaging", ResearchGate, Conference Paper, Apr. 2018, 6 pages.
Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.
Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.
Singh, Aditya et al., "Data-Based Quadrature Imbalance Compensation for a CW Doppler Radar System", https://www.researchgate.net/publication/258793573, IEEE Transactions on Microwave Theory and Techniques, Apr. 2013, 7 pages.
Suleymanov, Suleyman, "Design and Implementation of an FMCW Radar Signal Processing Module for Automotive Applications," Master Thesis, University of Twente, Aug. 31, 2016, 61 pages.
Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.
Thayaparan, T. et al., "Intelligent target recognition using micro-Doppler radar signatures," Defence R&D Canada, Radar Sensor Technology III, Proc, of SPIE, vol. 7308, 730817, Dec. 9, 2009, 11 pages.
Tu, Jianxuan et al., "Fast Acquisition of Heart Rate in Noncontact Vital Sign Radar Measurement Using Time-Window-Variation Technique", IEEE Transactions on Instrumentation and Measurement, vol. 65, No. 1, Jan. 2016, pp. 112-122.
Vinci, Gabor et al., "Microwave Interferometer Radar-Based Vital Sign Detection for Driver Monitoring Systems", IEEE MTT-S International Conference on Microwaves for Intelligent Mobility, Apr. 27-29, 2015, 4 pages.
Vinci, Gabor et al., "Six-Port Radar Sensor for Remote Respiration Rate and Heartbeat Vital-Sign Monitoring", IEEE Transactions on Microwave Theory and Techniques, vol. 61, No. 5, May 2013, pp. 2093-2100.
Wang, Fu-Kang et al., "Wrist Pulse Rate Monitor Using Self-Injection-Locked Radar Technology", Biosensors, MDPI, Oct. 26, 2016, 12 pages.
Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.
Will, Christoph et al., "Advanced Template Matching Algorithm for Instantaneous Heartbeat Detection using Continuous Wave Radar Systems", ResearchGate, May 2017, 5 pages.
Will, Christoph et al., "Human Target Detection, Tracking, and Classification Using 24-GHz FMCW Radar", IEEE Sensors Journal, vol. 19, No. 17, Sep. 1, 2019, pp. 7283-7299.
Will, Christoph et al., "Local Pulse Wave Detection using Continuous Wave Radar Systems", IEEE Journal of Electromagnetics, RF and Microwaves in Medicine and Biology, Oct. 25, 2017, 9 pages.
Will, Christoph et al., "Radar-Based Heart Sound Detection", Scientific Reports, www.nature.com/scientificreports, Jul. 26, 2018, 15 pages.
Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.
ETSI, "Short Range Devices; Measurement Techniques for Automotive and Surveillance Radar Equipment," European Standard, ETSI EN 303 396, Apr. 2016, 63 pages.
Heuel, DR. S. "Automotive radar technology, market and test requirements," White paper, Rohde & Schwarz, Oct. 2018, 36 pages.
Rocha, C., "Automated Solution to Test and Validate Automotive Radar Units," isep Institute Superior de Engenharia do Porto, Nov. 2019, 127 pages.

\* cited by examiner

MMWAVE RADAR TESTING

TECHNICAL FIELD

The present disclosure relates generally to an electronic system and method, and, in particular embodiments, to millimeter-wave (mmWave) radar testing.

BACKGROUND

Integrated circuits (ICs) are ubiquitous in modern society. Billions of ICs are fabricated each year, and can be found in devices from smart phones, to cars, to airplanes, and other electronic devices.

Automatic Test Equipment (ATE) is generally used during production to ensure that defective ICs are discarded (e.g., not shipped to consumers) in a process generally referred to as production testing. An ATE may be understood as a test equipment that includes a processing system, memory, etc., and that includes testing instruments, such as voltage and current measurement circuits, power supplies, signal generators, etc., for testing device under tests (DUTs).

During production testing, a DUT, such as an IC under test, is placed in a socket, generally by an automatic IC handler. The socket is generally attached to a printed circuit board (PCB) that is coupled to the ATE (also referred to as an intermediate PCB) and has (e.g., spring-loaded) pins that are designed to make contact with the pins/terminals/solder balls of the DUT. Once the DUT is in the socket, the ATE runs a test program that is designed to stimulate the DUT with the purpose of detecting functional faults and measuring performance parameters of the DUT. DUTs with detected functional faults or that do not meet the required performance are discarded (e.g., the handler picks the DUT from the socket and place it (e.g., digitally) in a Bad Bin. DUTs that show no functional faults and that meet the required performance are placed (e.g., digitally) in a Good Bin. DUTs in the Good Bin are categorized as Good Units and may be shipped to consumers, e.g., to be assembled into an intermediate or final product (e.g., soldered into a PCB to be installed into a device). DUTs in the Bad Bin are categorized as Bad Units and are discarded.

During production testing, it is not uncommon for the ATE to access (e.g., proprietary and/or secret) test modes and/or test sequences of the DUT not known to the DUT consumer (e.g., known only to the DUT manufacturer/designer) to fully and/or quickly stimulate the DUT to maximize test coverage and/or minimize test time.

SUMMARY

In accordance with an embodiment, a method for testing a millimeter-wave radar module includes: providing power to the millimeter-wave radar module, the millimeter-wave radar module including a printed circuit board (PCB), a millimeter-wave radar sensor coupled to the PCB, and a controller for radar signal processing, the controller coupled to the millimeter-wave radar sensor via the PCB; performing a plurality of tests indicative of a performance level of the millimeter-wave radar module; comparing respective results from the plurality of tests with corresponding test limits; and generating a flag when a result from a test of the plurality of test is outside the corresponding test limits, where performing the plurality of tests includes: transmitting a signal with a transmitting antenna coupled to the millimeter-wave radar sensor, modulating the transmitted signal with a test signal, and capturing first data from a first receiving antenna using an analog-to-digital converter of the millimeter-wave radar sensor, where generating the flag includes generating the flag based on the captured first data.

In accordance with an embodiment, a millimeter-wave radar module testing system includes: a millimeter-wave radar module including a printed circuit board (PCB), and a millimeter-wave radar sensor coupled to the PCB; and a controller coupled to the millimeter-wave radar sensor via the PCB, the controller configured to: perform a plurality of tests indicative of a performance level of the millimeter-wave radar module; compare respective results from the plurality of tests with corresponding test limits; and generate a flag when a result from a test of the plurality of test is outside the corresponding test limits, where performing the plurality of tests includes: transmitting a signal with a transmitting antenna coupled to the millimeter-wave radar sensor, modulating the transmitted signal with a test signal, and capturing first data from a first receiving antenna using an analog-to-digital converter of the millimeter-wave radar sensor, where generating the flag includes generating the flag based on the captured first data.

In accordance with an embodiment, a millimeter-wave radar module includes: a printed circuit board (PCB); a millimeter-wave radar sensor integrated circuit (IC) coupled to the PCB; a switching power converter IC coupled to the millimeter-wave radar sensor IC via the PCB; and a test controller coupled to the millimeter-wave radar sensor IC via the PCB, the test controller configured to: perform a plurality of tests indicative of a performance level of the millimeter-wave radar module; compare respective results from the plurality of tests with corresponding test limits; and generate a flag when a result from a test of the plurality of test is outside the corresponding test limits, where performing the plurality of tests includes: transmitting a signal with a transmitting antenna coupled to the millimeter-wave radar sensor IC, modulating the transmitted signal with a test signal, and capturing first data from a first receiving antenna using an analog-to-digital converter of the millimeter-wave radar module, where generating the flag includes generating the flag based on the captured first data.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
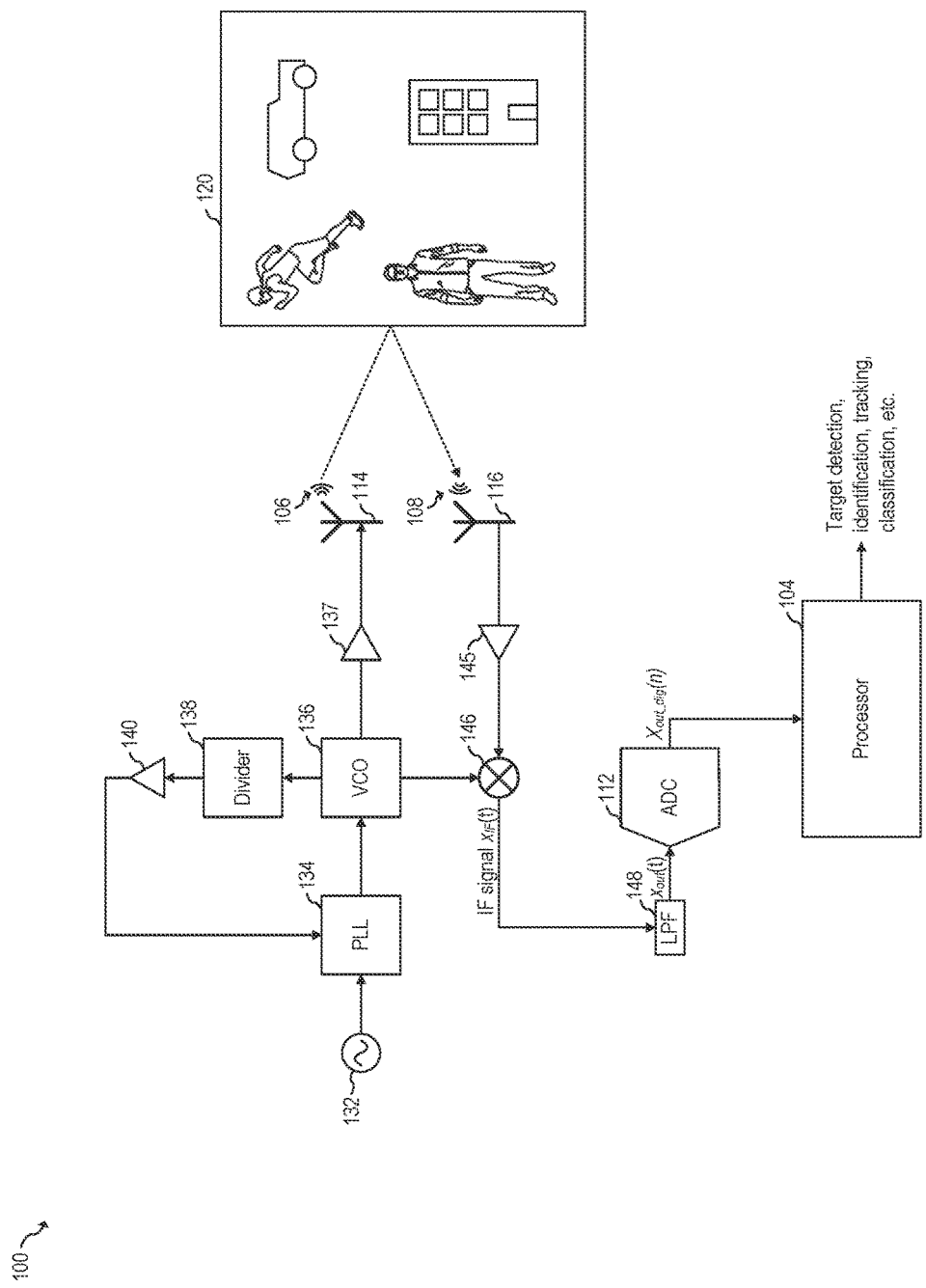
FIG. 1 shows a schematic diagram of an exemplary millimeter-wave radar system.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a system and method for testing millimeter-wave radar modules. Embodiments of the present invention may be used with radar modules operating in regimes different than millimeter-wave.

In an embodiment of the present invention, a predetermined set of tests is performed to test a millimeter-wave radar module to determine the performance of a millimeter-wave radar sensor when operating together with other circuits and structures of the millimeter-wave radar module. In some embodiments, the set of test is performed or triggered by a computer connected to the millimeter-wave radar module, e.g., using a USB cable. The set of tests may be configured and triggered with the computer, e.g., by using a graphical user interface (GUI) or by using command line. In other embodiments, the set of tests is performed by a microcontroller of the millimeter-wave radar module. By using a predetermined set of tests to determine the performance of a millimeter-wave radar sensor as installed in a millimeter-wave radar module, some embodiments advantageously allow a radar module manufacturer or other consumer to identify faulty radar modules or a faulty radar module design without having extensive radar knowledge, and without having to design custom tests and test systems.

Radar ICs, such as millimeter-wave radar ICs, are generally individually tested during production testing using ATE before being used in a final or intermediate product. However, radars may be very sensitive to environmental conditions, such as placement in electronic equipment, PCB-specific parameters, such as proper conductive planes for good grounding, noise and ripples introduced by neighboring micro-controllers, clocks and switching regulators, communication interfaces to host systems, and other components around the radar. Therefore, the performance of the ICs of a radar module, as individually tested during their respective production testing, may be different than the performance exhibited by such ICs when installed (e.g., soldered) to form a radar module. For example, a millimeter-wave radar sensor IC categorized as a Good Unit during production testing may fail one or more parameters once installed (e.g., soldered or placed in a socket) in a PCB that includes other components of the radar system (such as a micro-controller unit, power supply, etc.).

In an embodiment of the present invention, system-level production testing is performed on a millimeter-wave radar module. The millimeter-wave radar module includes a PCB, a power converter (e.g., a voltage converter), a millimeter-wave radar sensor, and a processor for radar signal processing coupled to the millimeter-wave radar sensor. The circuits of the millimeter-wave radar module may be implemented with a plurality of ICs that are coupled via the PCB. A test controller is used to stimulate the millimeter-wave radar sensor (and, e.g., other circuits) installed in the PCB, and determine whether the performance of one or more circuits of the millimeter-wave radar module are acceptable. Radar modules categorized as Good Modules (radar modules that pass all tests) may be used in an intermediate or final product. Radar modules categorized as Bad Modules (radar modules that fail at least one test) may be discarded. By using system-level production testing, some embodiments are advantageously capable of identifying radar modules that fail to meet specification requirements, even though the individual ICs of the radar module passed their respective individual production testing as Good Units.

In some embodiments, the test controller and/or a program executed by the test controller to stimulate the ICs of the radar module is designed, manufactured, and/or provided by the designer/manufacturer of an IC (e.g., such as a millimeter-wave radar sensor IC) of the radar module. Thus, in some embodiments, test modes of one or more ICs of the radar module and/or insight of one or more ICs of the radar module not available to the radar module designer/manufacturer are advantageously used during system-level production testing (e.g., performed by the radar module designer/manufacturer). In some embodiments, the use of test modes of ICs of the radar module may advantageously allow for higher test coverage to detect malfunctions of the radar module, even when the ICs of the radar module passed their respective production testing as a Good Units. In some embodiments, detecting malfunctions of the radar module during system-level production testing advantageously allows for detecting failures that would otherwise show up in the field (e.g., once the radar module is installed, e.g., in a car).

In some embodiments, the use of the test controller for testing the radar modules during system-level production testing advantageously allows for the testing of the radar modules (e.g., by the radar module designer/manufacturer) without using experienced radar experts.

FIG. 1 shows a schematic diagram of exemplary millimeter-wave radar system 100. Millimeter-wave radar system 100 may operate, e.g., as a frequency-modulated continuous-wave (FMCW) radar, as a pulse-Doppler radar, or in any other radar mode known in the art.

During normal operation, VCO 136 generates radar signals, such as a linear frequency chirps (e.g., from 57 GHz to 64 GHz, or from 76 GHz to 77 GHz, or other frequencies, e.g., between 20 GHz and 122 GHz or above), which are transmitted by transmitting antenna 114 towards scene 120. The VCO 136 is controlled by PLL 134, which receives a reference clock signal (e.g., 80 MHz) from reference oscillator 132. PLL 134 is controlled by a loop that includes frequency divider 138 and amplifier 140.

The radar signals 106 transmitted by transmitting antenna 114 are reflected by objects in scene 120 and the reflected signals are received by receiving antenna 116. The received reflected radar signals 108 are mixed with replicas of the signals transmitted by transmitting antenna 114 using mixer 146 to produce intermediate frequency (IF) signals $x_{IF}(t)$ (also known as the beat signal). The beat signal $x_{IF}(t)$ is filtered with low-pass filter (LPF) 148 and then sampled by analog-to-digital converter (ADC) 112 to generate raw digital data $x_{out\_aig}(n)$. The raw digital data $x_{out\_aig}(n)$ is then processed by processor 104 to perform, e.g., target detection, identification, tracking, and/or classification.

The objects in scene 120 may include static and moving objects, such as humans, vehicles, buildings, furniture, fans, machinery, mechanical structures, walls, etc.

Although FIG. 1 illustrates a radar system with one receiving antennas 116, it is understood that more than one receiving antenna 116, such as two, three, or more, may be used. Although FIG. 1 illustrates a radar system with a single transmitting antenna 114, it is understood that more than one transmitting antenna 114, such as two or more, may also be used.

Figure 2:
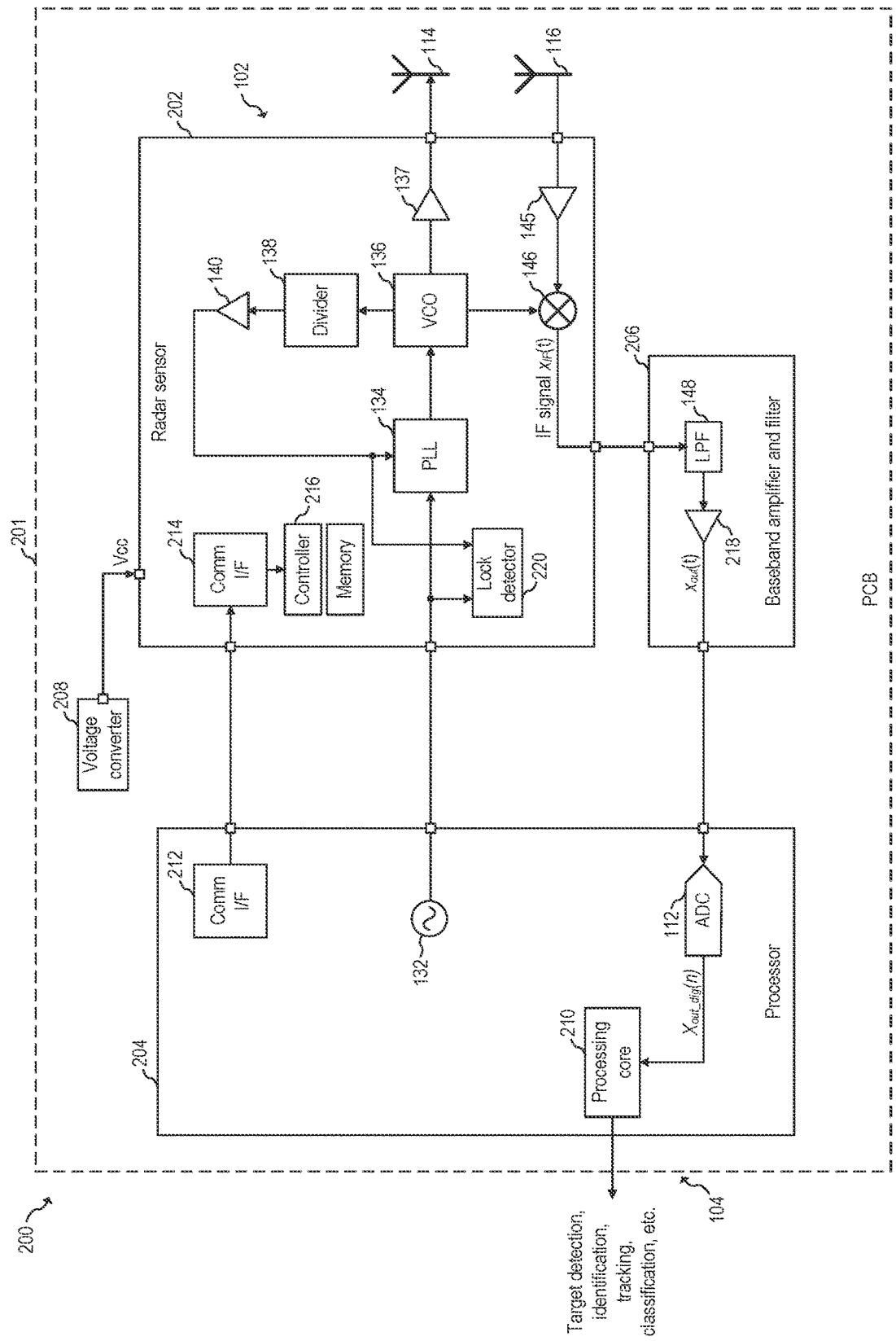
FIG. 2 shows a millimeter-wave radar module, according to an embodiment of the present invention.

A radar system, such as radar system 100, may be implemented with a plurality of ICs. For example, FIG. 2 shows millimeter-wave radar module 200, according to an embodiment of the present invention. Millimeter-wave radar module 200 is a possible implementation of radar system 100.

As shown in FIG. 2, millimeter-wave radar module includes radar sensor IC 202, processor IC 204, baseband amplifier and filter IC 206, and voltage converter IC 208. ICs 202, 204, 206, and 208 may be soldered or otherwise installed in PCB 201 (e.g., by using a socket) and may be coupled in a known manner using traces of the PCB.

Millimeter-wave radar sensor IC 202 includes PLL 134, VCO 136, frequency divider 139, amplifier 140, amplifiers 137 and 145, mixer 146, communication interface 214, and controller 216. Amplifiers 137 and/or 145 may be implemented as buffers, amplifiers with fixed gains, or variable gain amplifiers (VGAs).

Controller 216 controls one or more circuits of millimeter-wave radar sensor IC 202. Controller 216 may be implemented, e.g., as a custom digital or mixed signal circuit, for example. As will be described in more detail later, in some embodiments, controller 216 may also operate as a test controller.

Communication interface 214 may be used to receive instructions, e.g., from processor IC 204, for controlling one or more aspects of millimeter-wave radar sensor IC 202, e.g., via controller 216 and the use of a register map (not shown).

Antennas 114 and 116 may be integrated inside millimeter-wave radar sensor IC 202 or may be implemented external to millimeter-wave radar sensor IC 202.

Processor IC 204 may be implemented as a general purpose processor, controller or digital signal processor (DSP) that includes, for example, combinatorial circuits coupled to a memory. For example, processor IC 204 may be implemented as an application specific integrated circuit (ASIC). Processor IC 204 may include ADC 112, reference oscillator 132, processing core 210, and communication interface 212. Reference oscillator 132 may be implemented as an internal oscillator.

Reference oscillator 132 may use an external crystal. In some embodiments, reference oscillator runs at 80 MHz. Other frequencies may also be used.

Processing core 210 may perform radar signal processing operations, such as 2D FFTs, MTI filtering, beamforming, Kalman filtering, etc. Processing core 210 may be implemented in any way known in the art and may include an artificial intelligence (AI) accelerator.

Communication interfaces 212 and 214 may be of the serial peripheral interface (SPI) type. Other communication interfaces may also be used.

Baseband amplifier and filter IC 206 includes LPF 148, and amplifier 218. Although filter 148 is shown to be a low-pass filter in FIG. 2, other types of filters, such as band-pass filters, or combination of low-pass, high-pass and/or band-pass filters may also be used.

Voltage converter IC 208 provides power to millimeter-wave radar sensor IC 202. Voltage converter IC 208 may be implemented, e.g., as a switching converter, such as a buck, boost, or buck-boost. Voltage converter 208 may also be implemented as an LDO, for example. Voltage converter 208 may also be implemented with a combination of linear and switching regulators (e.g., cascaded).

As will be described in more detail layer, millimeter-wave radar module may include one or more test circuits, such as lock detector 220, a memory built-in self-tests (BIST) controller (which may be implemented by controller 216), test registers (e.g., for reporting status of one or more tests), etc.

Millimeter-wave radar module 200 is a possible implementation of radar system 100. Other implementations, such as implementation with more (or less) ICs, and with a different partition of blocks per IC, are also possible. For example, in a possible implementation, a portion of PLL 134 may be implemented inside processor IC 204. As another example, millimeter-wave radar sensor IC 202 may include LPF 148 and amplifier 218, e.g., so that the millimeter wave radar module does not include a dedicated IC for baseband amplifier and filtering. As yet another example, in some embodiments, baseband amplifier and filter IC may include a high-pass filter (HPF), followed by amplifier 218, and followed by LPF 148. Other implementations are also possible.

In an embodiment of the present invention, a set of tests is performed on a millimeter-wave radar module to determine the performance of the millimeter-wave radar module. If the millimeter-wave radar module passes all tests of the set of tests, the millimeter-wave radar module is categorized as a Good Module. If the millimeter-wave radar module fails one or more tests, the millimeter-wave radar module is categorized as a Bad Module.

Figure 3:
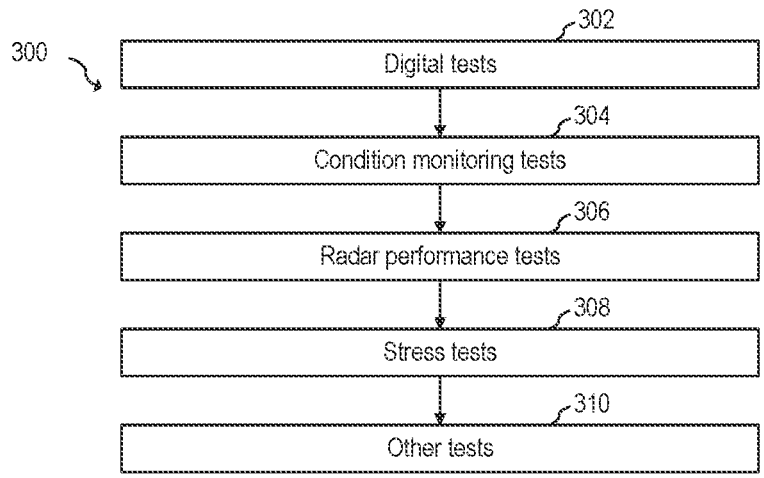
FIG. 3 shows a test sequence for testing a millimeter-wave radar module, according to an embodiment of the present invention.

FIG. 3 shows test sequence 300 for testing a millimeter-wave radar module, according to an embodiment of the present invention. Test sequence 300 includes digital tests 302, condition monitoring tests 304, radar performance tests 306, stress tests 308, and other tests 310. In some embodiments, a different order of performing tests 302, 304, 306, 308, and 310, may be used. For example, in some embodiments, not all radar performance tests 306 are performed together, and instead, one or more stress tests 310 may be performed in between radar performance tests 306.

Digital features of a radar module, such as radar module 200, are generally related to functional performance. In some embodiments, digital tests 302 are capable of detecting functional faults related to, e.g., power-up, communication, and configuration of a millimeter-wave radar sensor IC, such as millimeter-wave radar sensor IC 202. For example, soldering/contact issues of one or more ICs of the radar module, cracked traces, or missing components may cause such faults. In some embodiments, digital tests 302 include communication interface tests (e.g., testing SPI communication to/from the radar sensor IC), and/or memory tests (e.g., testing the memory of the radar sensor IC). In some embodiments, digital tests 302 may also include other digital tests, such as SCAN and JTAG tests.

Conditions such as temperature and voltage variations of a supply rail may be indicative of radar module assembly issues, as well as radar module design issues, and/or component issues (e.g., PCB issues). In some embodiments, condition monitoring tests 304 are capable of detecting, e.g., faults related supply rail issues and heat dissipation issues of one or more ICs of the radar module. For example, soldering/contact issues of one or more ICs of the radar module, cracked traces, or missing components may cause such faults. In some embodiments, condition monitoring tests 304 include supply voltage tests (e.g., as received by a radar sensor IC, such as millimeter-wave radar sensor IC 202) and temperature measurements (e.g., as measured by a temperature sensor inside the radar sensor IC). Other conditions monitoring tests, such as ambient temperature tests or temperature inside other ICs of the radar module, may also be performed.

The performance of the radar module may be impacted by the performance of their individual components (e.g., the performance of each IC of the radar module, the PCB, etc.) as well as the interaction between components. In some embodiments, radar performance tests 306 are capable of detecting, e.g., faults or performance degradation related to placement of, e.g., one or more ICs of the radar module, such as placement of the radar sensor IC with respect to other components, such as crystals, antennas, switching power supplies, etc. Other faults or performance degradation related to, e.g., PCB traces, antenna coupling to other structures (such as traces or ground planes, other metallic structures, etc.) of radar the module or surrounding equipment(s) (e.g., other circuits or modules, e.g., physically located nearby), as well as issues with signal strength, radar configuration issues, and RF signal coupling issues, etc., may also be detected. For example, soldering/contact issues of one or more ICs of the radar module, cracked traces, missing components, or design issues may cause such faults. In some embodiments, radar performance tests 306 include radar signal acquisition tests, transmitter and/or receiver power tests, transmitter and/or receiver noise floor tests, transmitter-receiver coupling tests, and baseband signal tests. Other radar performance tests, such as tests related to radar signal processing, may also be performed.

Conditions, such as variations in temperature and supply voltage may impact functional and/or parametric performance of one or more circuits of the radar module. For example. In some embodiments, stress tests 308 are capable of detecting, e.g., faults or performance degradation related to less than ideal conditions, such as parametric shifts due to hot temperature, for example. For example, clock frequencies, reference currents and other parameters may shift with temperature changes, which may cause functional faults or performance degradation of the radar module. In some embodiments, stress tests 308 includes heating up the radar sensor IC before or during the performance of another test, such as before or during a radar performance test 306, for example. Other stress tests, such as operating the radar under noisy conditions, or testing under maximum or minimum supply voltages, may also be performed.

In some embodiments, other tests 310 are performed, e.g., to detect functional faults or performance degradation related to soldering, supply quality, and device functionality. In some embodiments, other tests 310 include current consumption tests, PLL lock tests, and ADC signal-to-noise (SNR) tests. Other tests, such as BIST, reference voltage/current tests, etc., may also be performed.

In some embodiments, one or more tests of test sequence 300 may be omitted.

Figure 4:
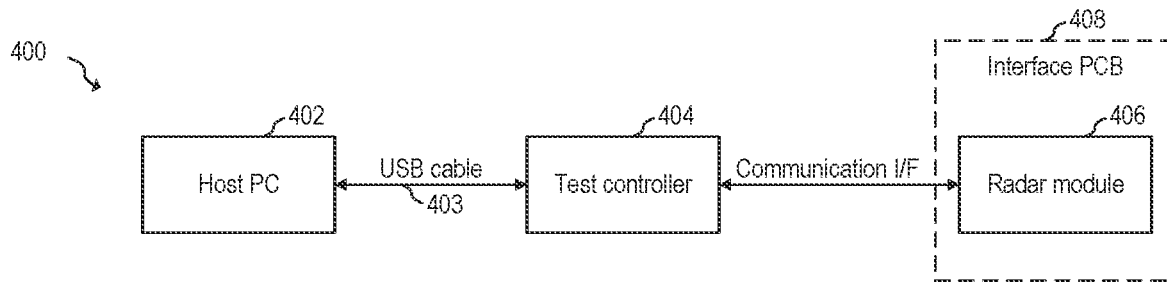
FIG. 4 shows a system for performing the test sequence of FIG. 3 using a host PC, according to an embodiment of the present invention.

In some embodiments, test sequence 300 may be implemented using a personal computer (PC), e.g., running operating systems Windows® or Linux®. For example, FIG. 4 shows system 400 for performing test sequence 300 using a host PC, according to an embodiment of the present invention. System 400 includes host PC 402, test controller 404, and radar module 406. Radar module 406 may be implemented, e.g., as radar module 200. In some embodiments, test controller 404 may be implemented as a test controller board (e.g., using a PCB) coupled between host PC 402 and radar module 406, omitting interface PCB 408. In some embodiments, the test controller board is coupled to radar module 406 via interface PCB 408. In some embodiments, test controller 404 may be implemented inside interface PCB 408 (e.g., soldered to PCB 408).

During normal operation, host PC 402 causes test controller 304 to performed test sequence 300 to test radar module 406. For example, in some embodiments, host PC 402 receives as input information associated with test sequence 300. For example, in some embodiments, test sequence 300 is stored in a memory coupled to host PC 402, e.g., stored in a test file; and host PC 402 receives the test file as input. In some embodiments, test sequence 300 is received from a user of host PC 402, e.g., that is using a graphical user interface (GUI) or command line instructions to provide test sequence 300.

After receiving the information associated with test sequence 300, host PC 402 causes test controller 404 to perform test sequence 300. For example, in some embodiments, host PC 402 reads the test file including information about test sequence 300 and communicates with test controller 404, e.g., using USB protocol and via a USB cable, to cause test controller 404 to perform test sequence 300. Test controller 404 then performs test sequence 300 by, e.g., triggering one or more tests (e.g., 302, 304, 306, 308, 310) using a communication interface (e.g., communication interface 214), perform or trigger one or more measurements, and determine pass/fail status for the one or more tests.

In some embodiments, test controller 404 is preconfigured for performing each test of test sequence 300, and host PC 402 determines which tests of test sequence 300 to perform, and the order in which the test are performed and communicates such determination to test controller 404 via the USB cable to cause test controller 404 to performed the determined sequence. In some embodiments, host PC 402 transmits via USB cable specific instructions to configure, trigger, and perform measurements, and/or make pass/fail determinations based on information of one or more tests of test sequence 300.

In some embodiments, some or all measurements are performed by ICs of radar module 406. In some embodiments, some or all measurements are performed by instruments coupled to test controller 404, e.g., via interface PCB 408, and/or inside test controller 404.

In some embodiments, test controller 404 is coupled to radar module 406 with additional cables and/or wirelessly using additional communication protocols and/or for directly measuring signals and/or for directly applying a stimulus.

In some embodiments, the test file storing information about test sequence 300 may be a JavaScript Object® Notation (JSON) file. Other formats, such as using XML or other standard or custom notation schemes may also be used.

Host PC 402 may be implemented as a personal computer running commercially available operating systems, such as operating systems Windows® or Linux®, for example. In some embodiments, host PC 402 may run a different operating system. For example, in some embodiments, host PC 402 may be implemented with a custom computer, controller, or processor running a custom operating system. Other implementations are also possible.

Test controller 404 may be implemented with a generic or custom processor or controller, e.g., having combinatorial logic coupled to a memory. Although FIG. 4 shows that host PC 402 communicates with test controller 404 using a USB cable and using a USB protocol, other communication protocols and other communication cables may also be used. For example, in some embodiments, universal asynchronous receiver-transmitter (UART) protocol over a serial cable may also be used. Other custom or standard communication protocols may also be used. Cables different from a USB cable or a serial cable, such as a fiber optic cable or a parallel cable, may also be used.

In some embodiments, system 400 is capable of operating in multiple modes, such as in production mode, and in reliability mode. In some embodiments, production mode is designed for distinguishing Good Modules from Bad Modules. In some embodiments, reliability mode is designed to collecting data for determining the performance of a radar module or a radar module design. In some embodiments, the reliability mode may be used for distinguishing Good Modules from Bad Modules.

In some embodiments, system 400 may be capable of only operating in a single mode (such as production mode or reliability mode).

In some embodiments, when operating in production mode, system 400 may include a test file (e.g., a JSON file) that includes information about test sequence 300. During production mode, all tests of test sequence 300 associated with production testing are performed, e.g., sequential, to detect functional faults or degradation in performance of radar module 406, e.g., for making a decision to ship the DUT (the radar module 406 under test) to a consumer. For example, in some embodiments, a user may cause all production tests of test sequence 300 to run by providing a command line trigger instruction in host PC 402. In some embodiments, a test log file may be generated with information about results of each test performed, such as a pass/fail indication and/or a parametric result, if applicable. In some embodiments, the test log may be stored in, e.g., a comma separated (CSV) file, or in any other suitable format.

In some embodiments, test controller 404 is coupled to radar module 406 using interface PCB 408. For example, in some embodiments, a radar module, such as radar module 200, is temporarily coupled to interface PCB 408 during testing. Once the test is finished, the DUT is decoupled from interface PCB 408, e.g., and a new DUT is coupled to interface PCB 408.

In some embodiments, a single radar module 406 may be tested at a time during production testing. In some embodiments, a plurality of radar modules 406 may be tested in parallel, which may advantageously reduce the test time. In some embodiments in which a plurality of radar modules 406 is tested in parallel, some tests may be performed sequentially between radar modules (e.g., radar signal acquisition tests may be performed sequentially between radar modules 406).

In some embodiments, test controller 404 may perform a firmware (FW) update of the DUT.

Figure 5:
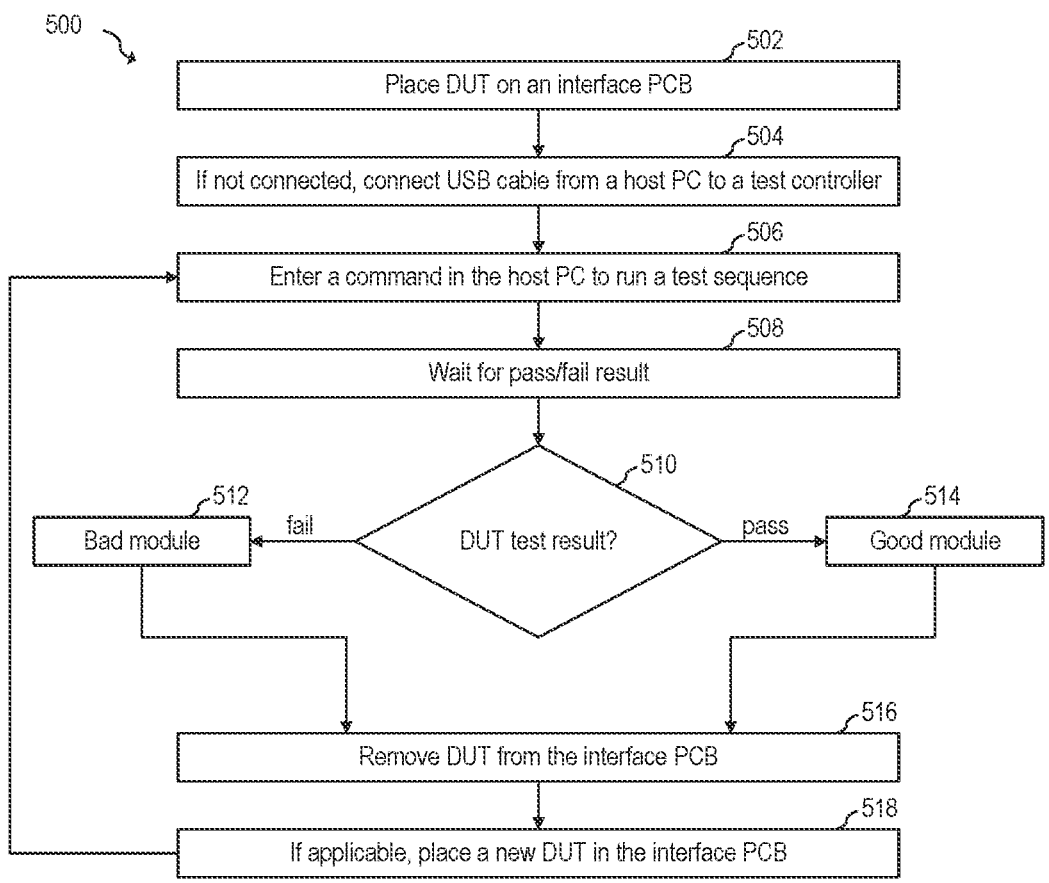
FIG. 5 shows a flow chart of an embodiment method for performing the test sequence of FIG. 3 using the system of FIG. 4 in production mode, according to an embodiment of the present invention.

FIG. 5 shows a flow chart of embodiment method 500 for performing test sequence 300 using system 400 in production mode, according to an embodiment of the present invention.

During step 502, a DUT, such as a radar module 200, is placed on an interface PCB, such as interface PCB 408, the interface PCB being coupled to a test controller, such as test controller 404. In some embodiments, the ICs of the radar module passed their respective production tests.

During step 504, a USB cable, such as USB cable 403, is connected between a host PC, such as host PC 402, and the test controller. In some embodiments, other communication cables/protocols, such as Ethernet, UART, SPI to UART converters, and other, e.g., common, communication interfaces, may also be used.

During step 506, an instruction, such as a command line instruction, is entered, e.g., by an operator of the host PC, to cause a test sequence, such as test sequence 300, to be performed on the DUT. In some embodiments, the instruction is entered, in a different manner, such as via a GUI.

During step 508, the test sequence is performed. If it is determined during step 510, e.g., by the test controller, that the DUT passed all tests, then the DUT is categorized as a good module during step 514. If it is determined during step 510 that the DUT failed one or more tests, then the DUT is categorized as a bad module.

During step 516, the DUT is removed from the interface PCB. If there are additional DUTs to test, then a new DUT is placed in the interface PCB during step 518, and step 506 is executed, repeating the sequence.

Figure 6:
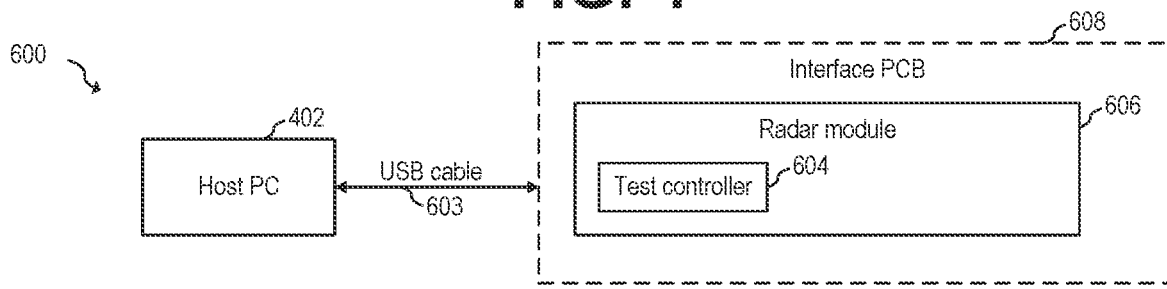
FIG. 6 shows a system for performing the test sequence of FIG. 3 using a host PC, according to an embodiment of the present invention

In some embodiments, the test controller is implemented inside the radar module. For example, in some embodiments, controller 216 also operates as a test controller. For example, FIG. 6 shows system 600 for performing test sequence 300, e.g., using method 500, according to an embodiment of the present invention. System 600 includes host PC 402, and radar module 606. Radar module 604 includes test controller 604. In some embodiments, radar module 604 is implemented as radar module 200, and test controller 606 is implemented with controller 216. In some embodiments, test controller 606 is implemented by a different controller implemented in radar module 606.

System 600 operates in a similar manner as system 400, and may implement method 500. System 600, however, may have host PC 402 coupled to interface PCB 608 via USB cable 603 (or a different cable) instead of coupled to an intermediate PCB having a test controller (such as test controller 404).

Figure 7:
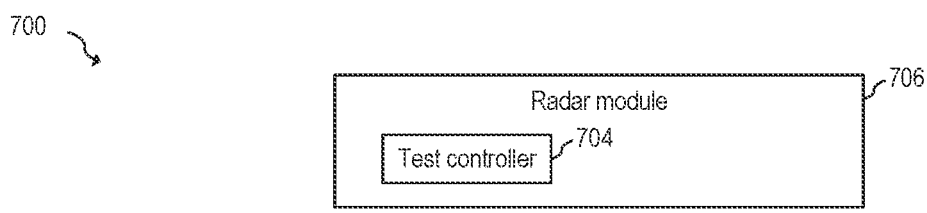
FIG. 7 shows a system for performing test sequence of FIG. 3 without using a host PC, according to an embodiment of the present invention.

In some embodiments, a modified version of method 500 may be implemented without using a host PC. For example, FIG. 7 shows system 700 for performing test sequence 300 without using a host PC, according to an embodiment of the present invention. System 700 includes radar module 706 and test controller 704. Radar module 706 may be implemented, e.g., as radar module 200. Test controller 704 may be implemented, e.g., inside processor IC 204. In some embodiments, test controller 704 may be implemented in a different IC, such as in a further processor or controller, such as a generic or custom processor or controller that includes and/or is coupled to a memory including instructions for performing test sequence 300.

In addition to performing radar operations (e.g., during normal mode), system 700 may be used to perform test sequence 300. For example, in some embodiments, system 700 may perform test sequence 300 by performing steps triggering the test sequence, and then performing steps 508, and 510 to determine whether the radar module is a good module (step 514) or a bad module (step 512).

In some embodiments, test sequence 300 may be triggered by touching a button of radar module 706, toggling a switch of radar module 706, or in any other way. After triggering test sequence 300, test controller 704 reads test sequence 300 (e.g., from a memory of radar module 706) and performs test sequence 300. After test sequence 300 finishes execution, radar module 706 may produce an indication of whether radar module 706 passed all tests or failed one or more tests of test sequence 300. In some embodiments, the pass/fail indication may be produced by using a LED, a sound, or in any other way known in the art.

In some embodiments, system 700, in addition to being capable of performing production testing before radar module 706 is installed in a final product, may also be capable of testing radar module 706 in the field. For example, test sequence 300, or a subset of test sequence 300, may be performed in the field, once radar module 706 is installed in a final product, such as in a car, for example. For example in some embodiments, a central microcontroller of a car may trigger test sequence 300, or a subset of test sequence 300 each time the car is started. For example, in some embodiments, central microcontroller may write using a communication interface (e.g., 214) a test code to trigger test sequence 300, and may receive a pass/fail result from the communication interface.

By performing a test sequence on a radar module when deployed in the field, some embodiments may be capable of detecting functional faults or degradation in performance due to aging and/or changes in the environment associated with the final product (e.g., a car), such as changes in a voltage supply, temperature, humidity, surrounding structure, etc.

In some embodiments, systems 400 or 600 may operate in reliability mode. For example, in reliability mode, some embodiments advantageously allow for detecting functional faults and degradation in performance associated with the design of the radar module (e.g., the design of the PCB, the placement of the components of the radar module), which may affect all radar modules of such design. In some embodiments, functional faults and degradation in performance associated with a particular radar module, e.g., due to soldering issues, missing components, etc., may also be detected in reliability mode.

Figure 8:
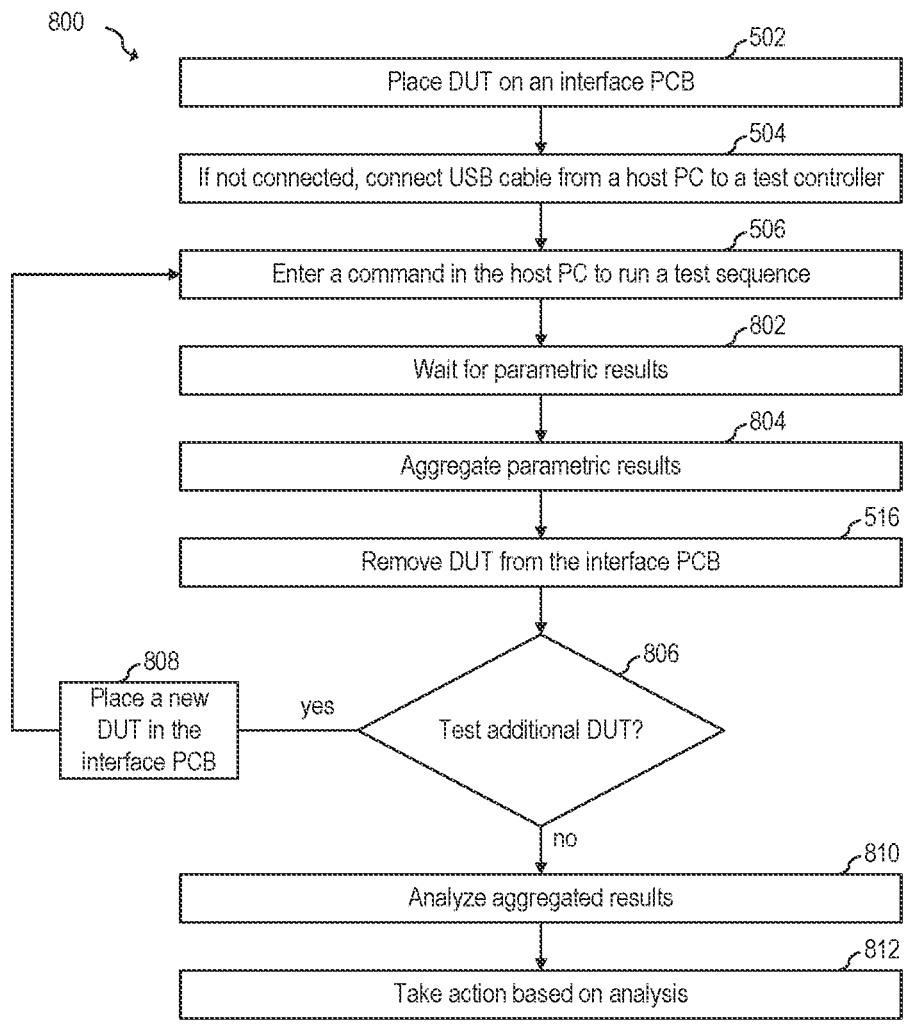
FIG. 8 shows a flow chart of an embodiment method for performing a test sequence using the system of FIG. 4 or 6 in reliability mode, according to an embodiment of the present invention.

In some embodiments, a GUI is used during reliability mode. For example, in some embodiments, an operator can select which individual test of test sequence 300 or which subset of tests of test sequence 300 to run. In some embodiments, once the tests are finished executing, a file including parametric results from the executed tests is generated. Data from such results files generated from one or more DUTs may be aggregated and analyzed, e.g., to determine test limits (e.g., for differentiating Good Modules from Bad Modules during production testing) and operating points of all radar modules of a particular design, as well as for making decisions for changing the design. For example, FIG. 8 shows a flow chart of embodiment method 800 for performing a test sequence using system 400 or 600 in reliability mode, according to an embodiment of the present invention.

In some embodiments, method 800 implements steps 502, 504, 506 and 516 in a similar manner as in method 500.

During step 802, the test sequence (which may be a subset of test sequence 300, such as a single test) is performed.

As illustrated by steps 804, 806, and 808, parametric test results from the test(s) performed during step 802 are aggregated from a plurality of DUTs.

Once all DUTs are tested, the aggregated results from the parametric tests are analyzed during step 810, and an action is taken based on the analysis during step 812. For example, in some embodiments, test limits for parametric tests, such as current consumption tests, radar signal acquisition tests, noise floor tests, signal coupling tests, gain tests, and/or SNR tests, are generated during step 810 for distinguishing a Good Module from a Bad Module (e.g., during production mode). In some embodiments, if a statistical distribution of the result from a particular test is unacceptable or below expectations, then a design change or optimization of settings (e.g., in controller 216) may be made to a radar module during step 812. For example, a ground plane design of the PCB of the radar module may be modified, or the selection of a voltage converted device of the radar module may be changed, e.g., if a noise floor is too high.

In some embodiments, method 800 may be performed multiple times for various conditions, such as for different temperatures, such as cold (e.g., −40° C.), room (e.g., 25° C.) and hot (e.g., 85° C.), and/or for different supply voltages, for example.

In some embodiments, a radar module manufacturer may advantageously use the reliability mode testing capability of system 400 or 600 to test the performance of the radar module, and/or determine test limits for system-level production tests without using experienced radar experts and/or by leveraging insight in radar chip settings that are generally not available outside the manufacturer of the radar chip. In some embodiments, performing reliability testing advantageously allows for detection of design issues of the radar module without sharing information regarding the design outside the radar module manufacturer team (e.g., without sharing radar module design information with a radar chip manufacturer).

Figure 9:
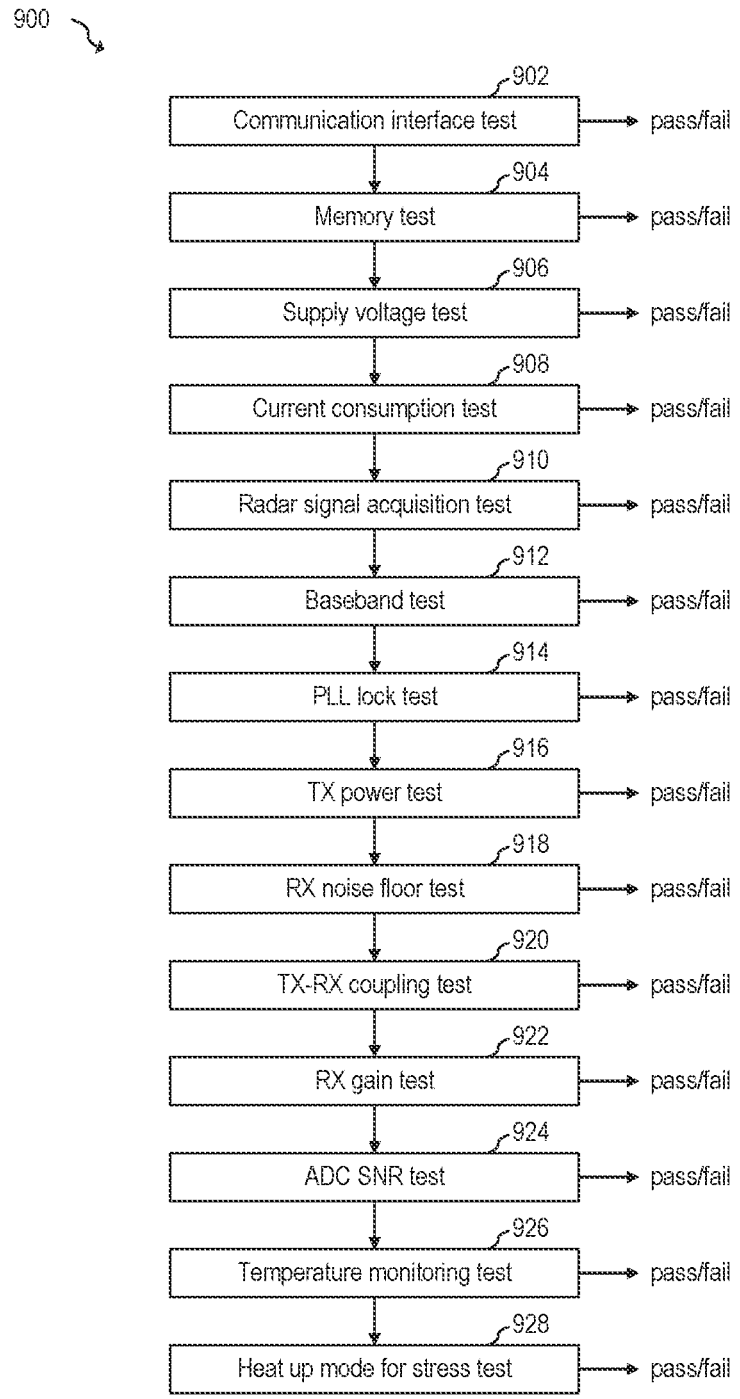
FIG. 9 shows a test sequence for testing a millimeter-wave radar module, according to an embodiment of the present invention.

FIG. 9 shows test sequence 900 for testing a millimeter-wave radar module, according to an embodiment of the present invention. Test sequence 900 illustrates a possible implementation of test sequence 300. For example, test sequence 900 implements digital tests 302 with communication interface test 902 and memory test 904; condition monitoring tests 304 with supply voltage test 906 and temperature monitoring test 926; radar performance tests 306 with radar signal acquisition test 910, baseband test 912, transmitter power test 916, receiver noise floor test 918, transmitter-receiver coupling test 920, and receiver gain test 922; stress tests 310 with heat up mode for stress test 928; and other tests 310 with current consumption test 908, PLL lock test 914, and ADC SNR test 924.

In some embodiments, tests 902, 904, 906, 908, 910, 912, 914, 916, 918, 920, 922, 924, 926 and 928 may be performed in a different order.

Figures 10, 11, 12:
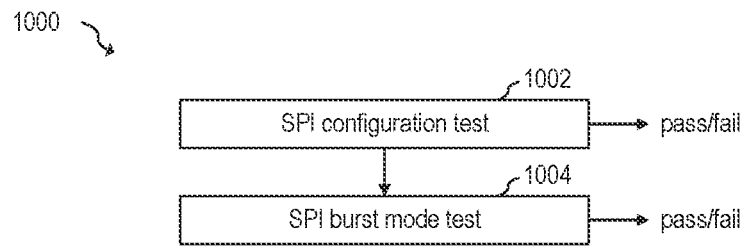
FIGS. 10-12 show flow charts of embodiment methods for performing a communication interface tests, according to embodiments of the present invention.

FIG. 10 shows a flow chart of embodiment method 1000 for performing a communication interface test, according to an embodiment of the present invention. Communication test 902 may be implemented as method 1000. In some embodiments, method 1000 may be implemented in production mode and/or in reliability mode.

As shown, method 1000 includes communication interface configuration test 1002, and communication interface burst mode test 1004. In the embodiment illustrated in FIG. 10, an SPI protocol is used. Some embodiments may implement method 1000 with protocols different than SPI.

In some embodiments, SPI configuration test 1002 checks whether the SPI interface of an IC of a radar module, such as SPI interface 214 of radar sensor IC 202 of radar module 200, is operating properly. In some embodiments, failing SPI configuration test 1002 may be indicative that the radar module (e.g., the radar sensor IC) is not powering up properly, the radar module has missing components, there are issues with soldering or pin contacts of one or more ICs of the radar module, etc.

In some embodiments, SPI burst mode test 1002 checks whether the SPI burst mode of the SPI interface of the radar module is operating correctly, and, e.g., whether SPI burst mode operates correctly at a rated (e.g., maximum) speed. In some embodiments, failing SPI burst mode test may be indicative of excessive parasitics in one or more coupling lines of an SPI bus, missing components, issues with soldering or pin contact, etc.

FIG. 11 shows a flow chart of embodiment method 1100 for performing a communication interface configuration test, according to an embodiment of the present invention. Communication interface configuration test 1002 may be implemented as method 1100. In the embodiment illustrated in FIG. 11, an SPI protocol is used. Some embodiments may implement method 1100 with protocols different than SPI.

In some embodiments, method 1100 may be implemented in production mode and/or in reliability mode.

During step 1102, a hardware reset is generated. In some embodiments, the hardware reset causes registers of a register map of the radar module (such as a register map of radar sensor IC 202) to load default values.

During step 1104, a first register of the register map is written using an SPI write command via an SPI interface of the radar module. In some embodiments, the first register may be an arbitrary register of the register map. In some embodiments, more than one register may be written.

During step 1106, the first register is read back using an SPI read command. If it is determined during step 11o8 that the data written into the first register during step 1104 matches the data read back from the first register during step 11o6, then the test passed. Otherwise, the test failed.

In some embodiments, method 1100 is performed a plurality of times, e.g., by writing different data to the same or different registers.

FIG. 12 shows a flow chart of embodiment method 1200 for performing a communication interface burst mode test, according to an embodiment of the present invention. Communication interface burst mode test 1004 may be implemented as method 1200. In the embodiment illustrated in FIG. 12, an SPI protocol is used. Some embodiments may implement method 1200 with protocols different than SPI.

In some embodiments, method 1200 may be implemented in production mode and/or in reliability mode.

During step 1202, a memory of the radar module, such as a memory of the radar sensor IC of the radar module, is loaded with a predefined data sequence. In some embodiments, a built-in linear-feedback shift register (LFSR) of the radar sensor IC is used to fill up the on-chip memory of the radar sensor IC with the predefined data sequence. In some embodiments, the predefined data sequence is loaded by writing the memory using SPI burst mode, or in any other way known in the art.

During step 1204, the memory is read back using SPI burst mode. If it is determined during step 1206 that the data read from the memory during step 1204 matches the predefined data sequence, then the test passed. Otherwise, the test failed.

In some embodiments, steps 1202, 1204, and 1206 are repeated several times, and a "pass" is achieved only if step 1206 outputs a "match" each of the several times that step 1206 is performed.

Figure 13:
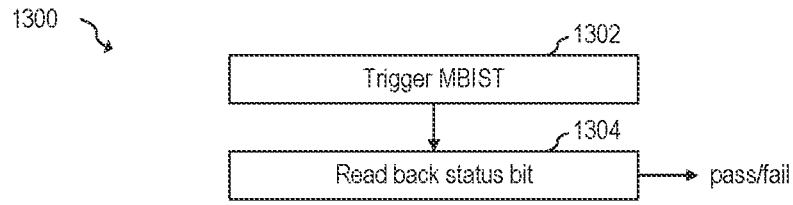
FIG. 13 shows a flow chart of an embodiment method for performing a memory test, according to an embodiment of the present invention.

FIG. 13 shows a flow chart of embodiment method 1300 for performing a memory test, according to an embodiment of the present invention. Memory test 904 may be implemented as method 1300.

In some embodiments, method 1300 may be implemented in production mode and/or in reliability mode.

During step 1302, a memory BIST (MBIST) is triggered. For example, a test controller, such as test controller 404, 604 or 704, may trigger MBIST by performing an SPI write command, e.g., to an MBIST test register of a register map of the radar module, such as a register map of the radar sensor IC. MBIST may be performed in any way known in the art.

After some time after triggering the MBIST (e.g., a few milliseconds after, such as 10 ms), an MBIST status bit is read from the register map during step 1304. If the MBIST status bit is asserted (e.g., 1), then the test passed. Otherwise, the test failed.

Figure 14:
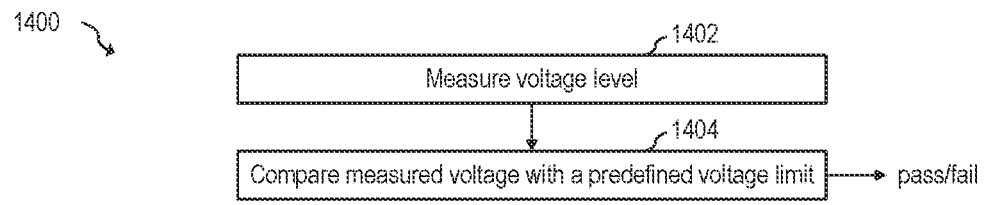
FIG. 14 shows a flow chart of an embodiment method for performing a supply voltage test, according to an embodiment of the present invention.

FIG. 14 shows a flow chart of embodiment method 1400 for performing a supply voltage test, according to an embodiment of the present invention. Supply voltage test 906 may be implemented as method 1400. In some embodiments, method 1400 is performed for voltage provided to radar sensor IC, such as to millimeter-wave radar sensor 202 (e.g., such as a 3.3 V rail and a 1.8V rail).

In some embodiments, method 1400 may be implemented in production mode and/or in reliability mode.

During step 1402, a voltage received by the radar sensor IC is measured. For example, in some embodiments, an ADC of the radar sensor IC is used to measure the voltage, the result being provided in a register of the radar sensor IC and accessible via SPI. In some embodiments, a voltage measurement instrument of the test controller (e.g., 404, 604, 704) or coupled to the test controller is used to measure the supply voltage. For example, in some embodiments, the test controller gains access to the voltage rail via the interface PCB (e.g., 408, 608).

During step 1404, the measured voltage is compared with predefined test limit. For example, in some embodiments in which the radar sensor IC receives a 1.8 V supply, the predefined limits for the 1.8 V supply may be 1.7 V and 1.9 V, so that a measured voltage outside the 1.7 V to 1.9 V range is considered a fail, while a voltage higher than or equal to 1.7 V and lower than or equal to 1.9 V is considered a pass. As another non-limiting example, in some embodiments in which the radar sensor IC receives a 3.3 V supply, the predefined limits for the 3.3 V supply may be 2.9 V and 3.4 V, so that a voltage outside the 2.9 V to 3.4 V range is considered a fail, while a voltage higher than or equal to 2.9 V and lower than or equal to 3.4 V is considered a pass.

In some embodiments, method 1400 is performed for more than one supply voltage. For example, in some embodiments in which the radar sensor IC receives a 1.8 V and a 3.3 V supplies, method 1400 is performed for both of the supplies and the test is considered a pass only if it passes both tests.

In some embodiments, other supply rails of the radar module may also be tested using method 1400.

Figure 15:
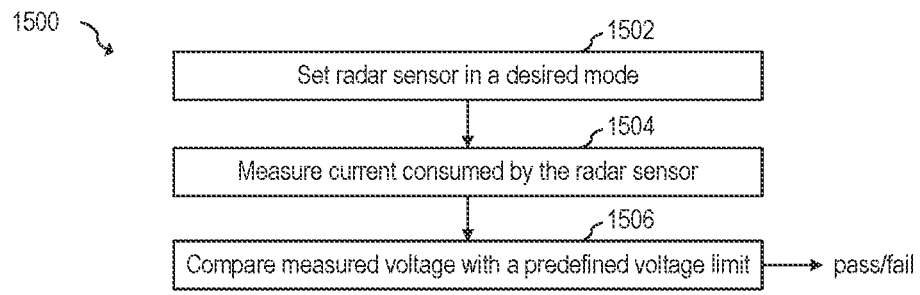
FIG. 15 shows a flow chart of an embodiment method for performing a current consumption test, according to an embodiment of the present invention.

FIG. 15 shows a flow chart of embodiment method 1500 for performing a current consumption test, according to an embodiment of the present invention. Current consumption test 908 may be implemented as method 1500. In some embodiments, method 1500 is performed for multiple modes of a radar sensor IC (such as radar sensor IC 202). For example, in some embodiments, method 1500 may be performed when the radar sensor IC is in reset mode, wake-up mode, initialization mode, and sampling mode.

In some embodiments, method 1500 may be implemented in production mode and/or in reliability mode. For example, in some embodiments, method 1500 may be performed for a single mode (e.g., sampling mode), or for two modes (e.g., sampling mode and reset mode), when in production mode, and may be performed for reset mode, wake-up mode, initialization mode, and sampling mode when in reliability mode. Other implementations are also possible.

During step 1502, the radar sensor IC is set to a desired mode (e.g., such as reset mode, wake-up mode, initialization mode, or sampling mode).

During step 1504, a current consumed by the radar sensor IC (or by a sub-block of the radar sensor IC, such as the PLL circuit) is measured. In some embodiments, a current measuring sensor of the radar sensor IC is used to measure the current consumed, the result being provided in a register of the radar sensor IC and accessible via SPI. In some embodiments, a current measurement instrument of the test controller (e.g., 404, 604, 704) is used to measure the current consumed by the radar sensor IC. For example, in some embodiments, the test controller gains access to a supply terminal of radar sensor IC consuming the current via the interface PCB (e.g., 408, 608).

During step 1506, the measured current is compared with predefined current limit. For example, in some embodiments a measured current lower than a predefined threshold is considered a pass while a measured current above the predefined threshold is considered a fail. In some embodiments, a measured current is considered a pass only if it is inside a predefined current range (e.g., higher than 2 mA and lower than 3 mA).

In some embodiments, the current limits are different depending on which mode the radar sensor IC is set during step 1502. For example, in some embodiments, the current limits when the radar sensor IC is in reset mode is in the µA range (e.g., measured currents are considered a pass if between 50 µA and 250 µA), the current limits when the radar sensor IC is in wake-up mode is in low mA range (e.g., measured currents are considered a pass if between 2.5 mA and 4 mA), and the current limits when the radar sensor IC is in initialization mode and sampling mode are in a mid mA range (e.g., measured currents are considered a pass if between 100 mA and 175 mA for the initialization mode, and between 150 mA and 200 mA for the sampling mode). Other test limits are also possible.

In some embodiments, the current measured is the aggregated current consumed from more than one supply (e.g., the current consumed from a 1.8 V supply plus the current consumed from a 3.3 V supply). In some embodiments, the current measured corresponds only to the current consumed by a circuit of the radar sensor IC. For example, in some embodiments, the current measured corresponds to the current consumed by PLL circuit 134 only.

In some embodiments, method 1500 is performed for more than one mode and/or more than one circuit, and the test is considered pass only if it passes all current consumption tests.

Figure 16:
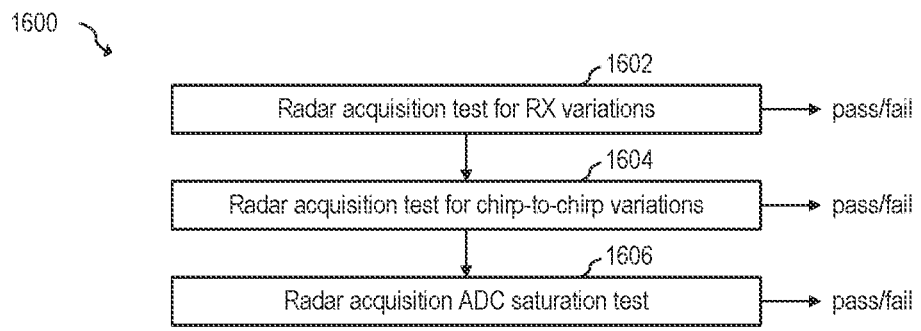
FIGS. 16-18 show flow charts of embodiment methods for performing radar signal acquisition tests, according to embodiments of the present invention.

FIG. 16 shows a flow chart of embodiment method 1600 for performing a radar signal acquisition test, according to an embodiment of the present invention. Radar signal acquisition test 910 may be implemented as method 1600.

In some embodiments, method 1600 may be implemented in production mode and/or in reliability mode. For example, in some embodiments, method 1600 may be performed for various settings during reliability mode, while only a subset of such tests are performed in production mode. Other implementations are also possible.

As shown, method 1600 includes radar acquisition test for receiver variations 1602, radar acquisition test for chirp-to-chirp variations 1604, and radar acquisition ADC saturation test. In some embodiments, during radar acquisition tests (e.g., 1602, 1604, 1606), a millimeter-wave radar sensor IC, such as millimeter-wave radar sensor IC 202, is in active radar mode and delivers samples for each chirp.

In some embodiments, radar acquisition test for receiver variations 1602 checks variations in amplitude between signals received by different antennas 116. In some embodiments, the variations are checked at different operating points and an optimum operating point is selected, e.g., to minimize variations in amplitude between different antennas 116. In some embodiments, radar acquisition test 1602 is performed in reliability mode and is not performed in production mode.

In some embodiments, radar acquisition test for chirp-to-chirp variations 1604 checks variations between two (e.g., consecutive) chirps. In some embodiments, radar acquisition test for chirp-to-chirp variations 1604 is capable of detecting ramp start-up issues, e.g., where a first chirp has different starting behavior than a second (e.g., following) chirp.

In some embodiments, radar acquisition ADC saturation test 1606 checks whether the ADC is getting saturated during data acquisition. In some embodiments, radar acquisition ADC saturation test 1606 may be used for determining a set point for the radar sensor IC. For example, in some embodiments, radar acquisition ADC saturation test 1606 may be used for determining baseband gain, transmitter power, and/or number of samples, e.g., to optimize usage of the ADC dynamic range.

Figure 17:
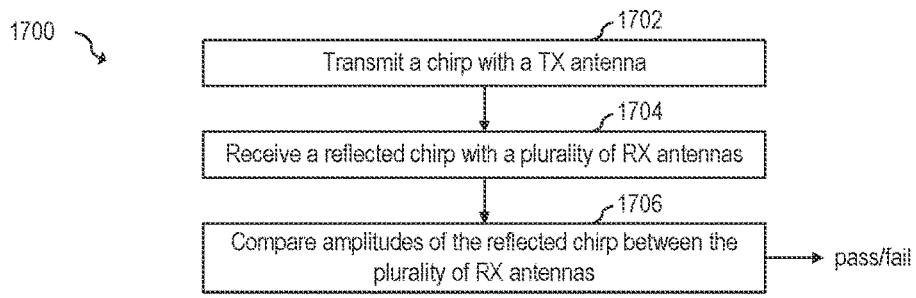

FIG. 17 shows a flow chart of embodiment method 1700 for performing a radar acquisition test for receiver variations, according to an embodiment of the present invention. Radar acquisition test for receiver variations 1602 may be implemented as method 1700.

During step 1702, a millimeter-wave radar sensor IC, such as millimeter-wave radar sensor IC 202, transmits a chirp, e.g., via transmitting antenna (e.g., antenna 114). In some embodiments, the chirp is transmitted in a clean environment (e.g., with no reflectors in the near field-of view of the millimeter-wave radar sensor IC, such as within 6 cm from the transmitting or receiving antennas).

During step 1704, a reflected chirp is captured by a plurality of receiving antennas, such as a plurality of receiving antennas 116 coupled to the millimeter-wave radar sensor IC.

During step 1706, amplitudes (e.g., mean amplitudes or peak amplitudes) of the reflected chirp from the plurality of receiving antennas are compared to each other to determine whether the test passed or failed. For example, in some embodiments, if the difference between the measured amplitudes from each of the receiving antennas is lower than a predefined threshold, the test is considered a pass. Otherwise, it is considered a fail.

In some embodiments, the radar acquisition test for receiver variations is considered a pass if all amplitudes from the plurality of receiving antennas are within a predefined range; and the test is considered a fail otherwise.

Figure 18:
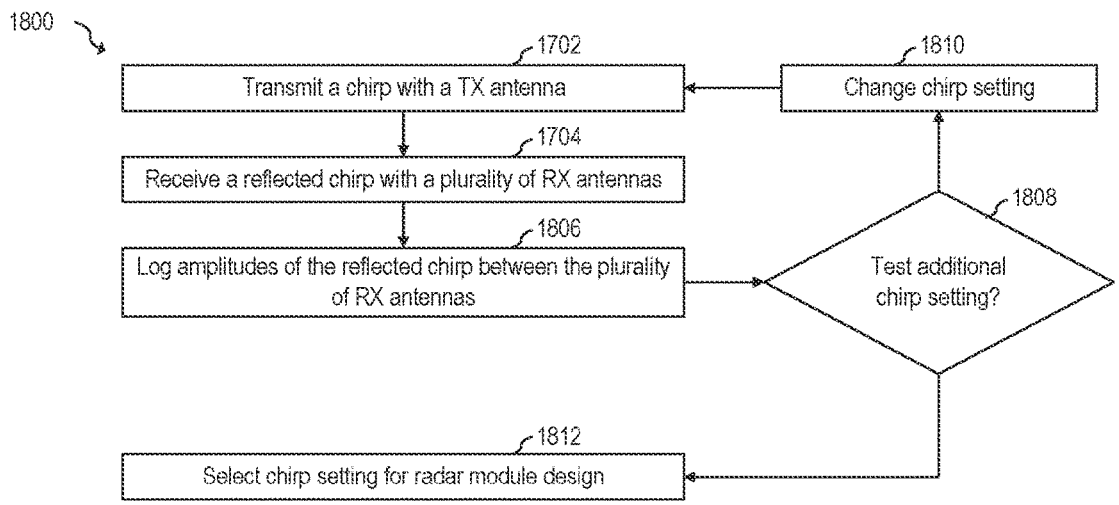

In some embodiments, a radar acquisition test for receiver variations may be performed in reliability mode on a plurality of radar modules of a same design to determine an operating mode for the radar module. For example, FIG. 18 shows a flow chart of embodiment method 1800 for performing a radar acquisition test for receiver variations, according to an embodiment of the present invention. Method 1800 includes steps 1702, 1704, 1806, 1808, 1810, 1812, and 1814. Steps 1702 and 1704 may be performed in a similar manner as in method 1700.

During step 1806, amplitudes of the reflected chirp from each of the plurality of receiving antennas are logged.

As shown by steps 1808 and 1810, steps 1702 and 1704 and 1806 are repeated for a plurality of settings. Once results from all desired settings have been tested, a (e.g., optimum) chirp setting is selected during step 1812. In some embodiments, the chirp settings iterated during step 1808 include a plurality of chirp start frequencies. Other settings, such as chirp bandwidth, chirp waveform, etc., or a combination thereof, may also be evaluated.

Figure 19:
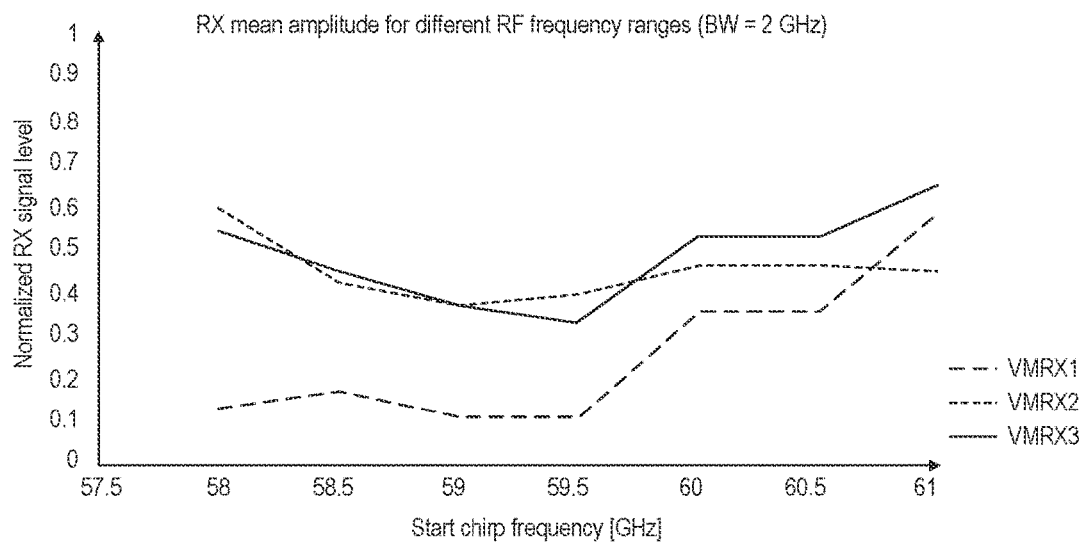
FIG. 19 shows a plot illustrating results from the method of FIG. 18, as performed in reliability mode, according to an embodiment of the present invention.

FIG. 19 shows a plot illustrating results from method 1800, as performed in reliability mode, according to an embodiment of the present invention. As shown, normalized amplitudes of a receiving chirp are captured for different start frequencies for three receiving antennas 116. As can be seen from FIG. 19, a start frequency of 60 GHz minimizes the differences in amplitude between the three receiving antennas 116. Thus, in this particular example, a start frequency of 60 GHz is selected during step 1812. In some embodiments, the setting selected during step 1812 may be used while performing method 1700 during production testing.

Figure 20:
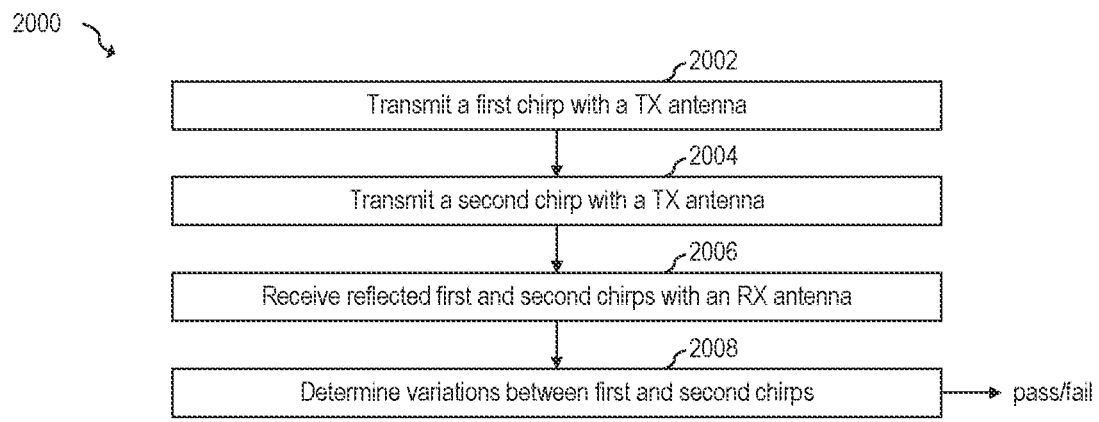

FIG. 20 shows a flow chart of embodiment method 2000 for performing a radar acquisition test for chirp-to-chirp variations, according to an embodiment of the present invention. Radar acquisition test for chirp-to-chirp variations 1604 may be implemented as method 2000.

During step 2002, a millimeter-wave radar sensor IC, such as millimeter-wave radar sensor IC 202, transmits a first chirp, e.g., via TX antenna 114. In some embodiments, the chirp is transmitted in a clean environment (e.g., with no reflectors in the near field-of view of the millimeter-wave radar sensor IC, such as within 6 cm from the transmitting or receiving antennas).

During step 2004, the millimeter-wave radar sensor IC transmits a second chirp, e.g., via TX antenna 114. In some embodiments, the first and second chirps are consecutive chirps, e.g., inside the same frame.

During step 2006, a receiving antenna, such as receiving antenna 116, receives reflected first and second chirps corresponding to the first and second transmitted chirps, respectively. It is understood that the first reflected chirp may be received before, during, or after step 2004 is performed.

During step 2008, variations between the first and second chirps are determined. For example, in some embodiments, variations between the mean values and/or peak amplitudes of the first and second chirps are compared. Variations exceeding a predetermined threshold result in the test failing while variations within the predetermine thresholds result in the test passing. For example, in some embodiments, if the difference between the measured mean values between the first and second chirps is lower than a predefined high threshold and higher than a predefined low threshold, the test is considered a pass. Otherwise, it is considered a fail.

Figure 21:
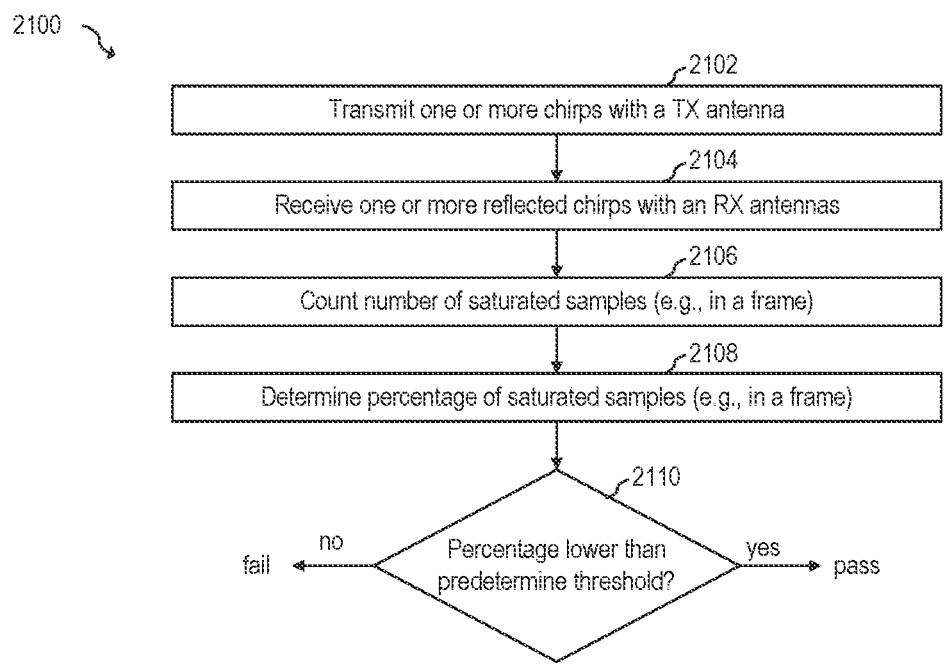
FIGS. 21 and 22 show flow charts of embodiment methods for performing radar signal acquisition tests, according to embodiments of the present invention.

FIG. 21 shows a flow chart of embodiment method 2100 for performing a radar acquisition ADC saturation test, according to an embodiment of the present invention. Radar acquisition ADC saturation test 1606 may be implemented as method 2100.

During step 2102, a millimeter-wave radar sensor IC, such as millimeter-wave radar sensor IC 202, transmits one or more chirps, e.g., via a transmitting antenna, such as antenna 114. For example, in some embodiments, a frame of, e.g., 16 chirps, is transmitted during step 2102. In some embodiments, the number of chirps in the transmitted frame may be different from 16, such as 8, or lower, or 32, 64, or higher. In some embodiments, a single chirp is transmitted during step 2102.

In some embodiments, the chirp/frame is transmitted in a clean environment (e.g., with no reflectors in the near field-of view of the millimeter-wave radar sensor IC, such as within 6 cm from the transmitting or receiving antennas).

During step 2104, a receiving antenna, such as receiving antenna 116, receives one or more reflected chirp corresponding to the one or more transmitted chirps, respectively.

During step 2106, the number of saturated samples corresponding to the one or more received reflected chirps is counted. For example, if and ADC, such as ADC 112, is implemented with 8-bits, a counter configured to count the number of saturated samples is incremented each time ADC 112 outputs a value of 0x00 or 0xFF. The counter may be implemented inside a controller of the radar sensor IC (e.g., such as inside controller 216).

During step 2108, a percentage of saturated samples is determined. For example, if 100 samples are received and 5 samples are equal to a max count of the ADC (e.g., 0xFF) or a min count of the ADC (0x00), then the percentage of saturated samples is 5%. If it is determined during step 2110 that the percentage is lower than a predetermined threshold, the test is considered a pass. Otherwise, the test is considered a fail.

Figure 22:
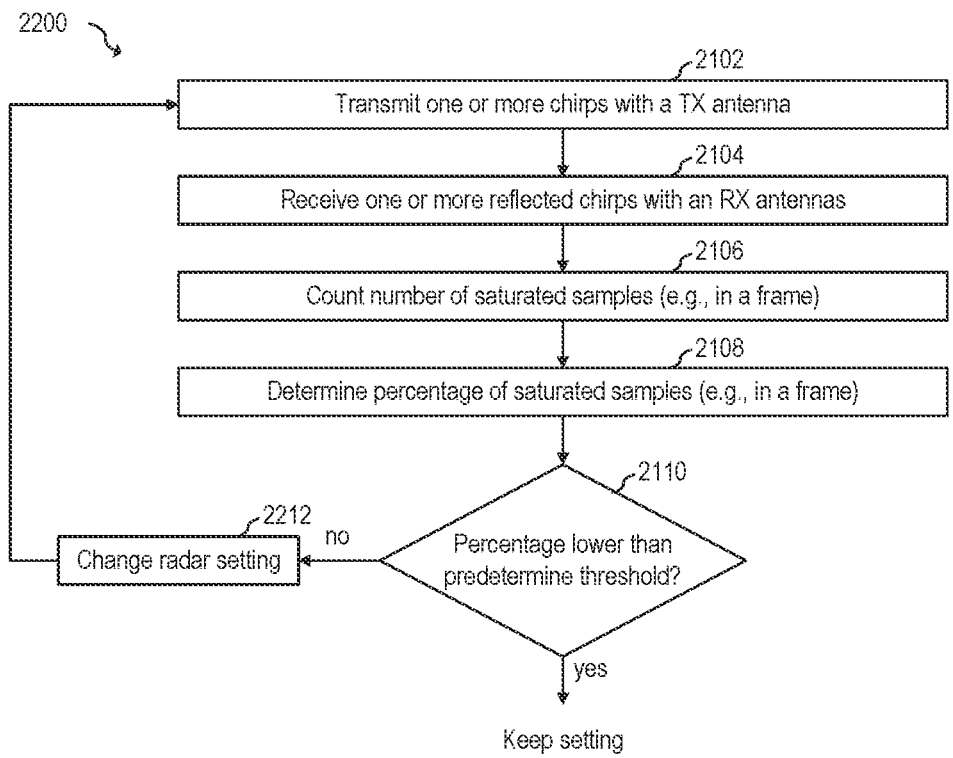

In some embodiments, a radar acquisition ADC saturation test may be performed in reliability mode on a plurality of radar modules of a same design to determine an operating mode for the radar module. For example, FIG. 22 shows a flow chart of embodiment method 2200 for performing a radar acquisition ADC saturation test, according to an embodiment of the present invention. Method 2200 includes steps 2102, 2104, 2106, 2108, 2110, and 2212. Steps 2102, 2104, 2106, 2108 and 2110 may be performed in a similar manner as in method 2100.

As shown by steps 2110 and 2212, steps 2102, 2104, 2106, and 2108 may be repeated a plurality of times until the percentage of saturated samples is kept below a predetermined threshold (which may be the same or lower than the predetermined threshold used in method 2100).

The settings of the radar settings adjusted during step 2212 include adjusting (e.g., reducing) baseband gain and/or TX power, and/or adjusting (e.g., increasing) the number of received samples.

Figures 23A, 23B:
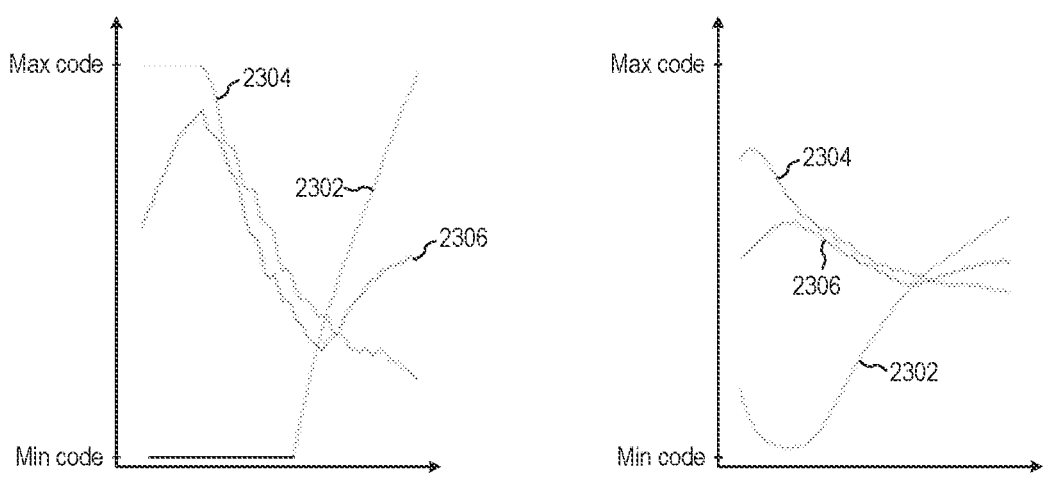
FIGS. 23A and 23B show plots illustrating analog-to-digital converter (ADC) codes from reflected chirps received by three receiving antennas before and after performing the method of FIG. 22, respectively, as performed in reliability mode, according to an embodiment of the present invention.

FIGS. 23A and 23B show plots illustrating ADC codes versus time generated from reflected chirps received by three receiving antennas before and after performing method 2200, respectively, as performed in reliability mode, according to an embodiment of the present invention. Curves 2302, 2304, and 2306 correspond to first, second, and third receiving antennas (also referred to as first, second, and third channels), respectively.

As shown in FIG. 23A, before applying method 2200, the first and second channels are saturated with minimum and maximum codes, respectively. The third channel does not exhibit any saturation in the plot of FIG. 23A.

As shown in FIG. 23B, after performing method 2200, the selected radar setting causes the amplitudes of all three channels to be reduced so that the number of saturated samples is reduced or eliminated. In some embodiments, the final setting selected during step 2108 of method 2200 may be used while performing method 2100 during production testing.

Figure 24:
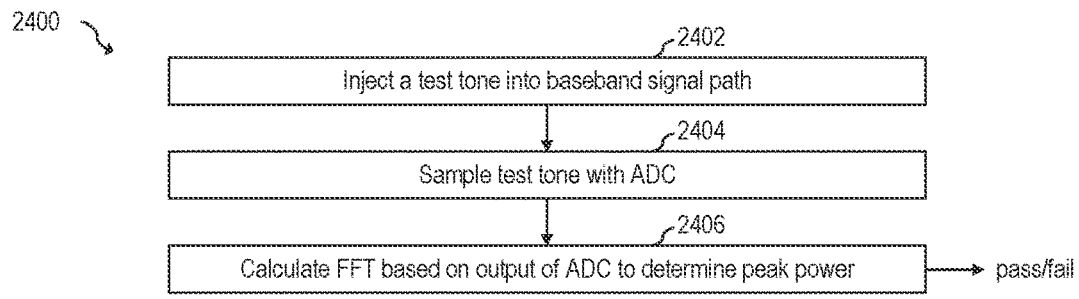
FIG. 24 shows a flow chart of an embodiment method for performing a baseband test, according to an embodiment of the present invention.

FIG. 24 shows a flow chart of embodiment method 2400 for performing a baseband test, according to an embodiment of the present invention. Baseband test 912 may be implemented as method 2400.

In some embodiments, method 2400 may be implemented in production mode and/or in reliability mode.

During step 2402, a test controller, such as controller 404, 604 or 704, injects a test tone into a baseband signal path of a millimeter-wave radar sensor IC, such as millimeter-wave radar sensor IC 202. For example, in some embodiments, a 200 kHz sinewave is injected at an output of a mixer (e.g., mixer 146). Other frequencies (e.g., 250 kHz or higher, such as 400 kHz) and waveforms other than sinewaves (e.g., sawtooth wave) may also be used.

During step 2404, an ADC, such as ADC 112, samples the test tone.

During step 2406, a processing core, such as processing core 210, calculates an FFT of the test tone to determine a peak power. If the peak power is within a target peak power range (e.g., +/−2 dB of expected peak power), the test is considered a pass. Otherwise, the test is considered a fail.

In some embodiments, method 2400 is performed for various radar module settings, such as for various gains of one or more baseband filters (e.g., filter 148), one or more gains of amplifier 218, and/or various test tone frequencies and/or test tone waveforms.

Figure 25:
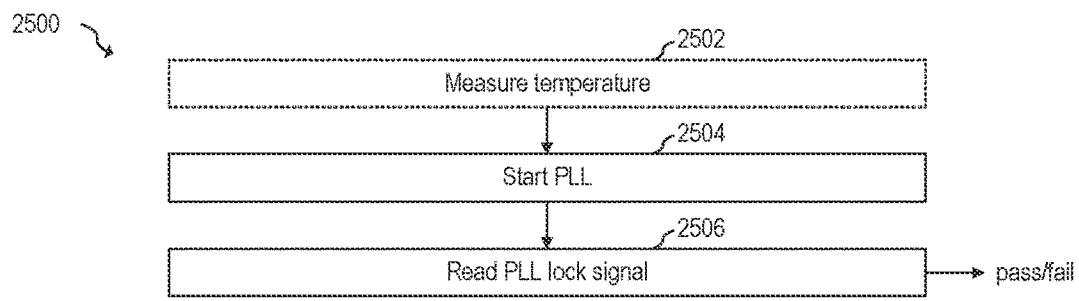
FIG. 25 shows a flow chart of an embodiment method for performing a phase locked loop (PLL) lock test, according to an embodiment of the present invention.

FIG. 25 shows a flow chart of embodiment method 2500 for performing a PLL lock test, according to an embodiment of the present invention. PLL lock test 914 may be implemented as method 2500.

In some embodiments, method 2500 may be implemented in production mode and/or in reliability mode.

During step 2504, a PLL circuit, such as a circuit including PLL 134, VCO 136, divider 138, and buffer 140, is started. While the PLL circuit is running, a lock detection circuit, such as lock detector 220, asserts a signal when the PLL circuit is locked, and deasserts the signal when the PLL circuit is not locked. For example, in some embodiments, the lock detection circuit asserts a lock detection signal (e.g., high) after a plurality of consecutive pulses (e.g., 12 consecutive pulses) in which the reference clock (e.g., from clock 132) and the divided clock (e.g., from buffer 140) are synchronized within a predetermined time window (e.g., within 5 ns, or within a window between 300 ps and 4.5 ns). The lock detection circuit deasserts the lock detection signal (e.g., low) after n consecutive lock fails (in which the signal transitions of the reference clock and the divided clock are outside the predetermined time window). In some embodiments, n is 4 or lower, such as 3, 2, or 1. In other embodiments, n is higher than 4, such as 5 or higher.

In some embodiments, the lock detection circuit is implemented inside a controller of the millimeter-wave radar sensor IC (e.g., inside controller 216).

During step 2406, the lock detection signal is read/determined, e.g., by a test controller (such as test controller 404, 604, or 704). If the lock detection signal is deasserted, the test failed. Otherwise, the test passed.

In some embodiments, the lock detection signal is read/determined a plurality of times while the PLL is running. For example, in some embodiments, the lock detection signal is read/determined a plurality of times during a predetermined amount of time. In some embodiments, if it is determined that the lock detection signal is deasserts at least once during the predetermined amount of time, the test fails.

In some embodiments, the lock detection signal is determined by measuring a signal from an interrupt (e.g., IRQ) pin of the radar sensor IC. In some embodiments, the lock detection signal is determined by reading a register of the radar sensor IC (e.g., accessible via SPI). For example, in some embodiments, asserting the lock detection signal comprises writing a 1 to a PLL status bit of a PLL status register while deasserting the lock detection signal comprises writing a 0 to the PLL status bit. Other implementations are also possible.

The temperature at which method 2500 is performed may affect the frequency and PLL locking performance of the PLL. In some embodiments, step 2502 is performed, in which the temperature of the millimeter-wave radar sensor IC is measured prior to starting the PLL (step 2504). If the temperature is outside a predetermined range (e.g., colder than a predetermined cold temperature or hotter than a predetermined hot temperature), then steps 2604 and 2606 are not performed. As will be described in more detail later, step 2502 may be performed as part of a temperature monitoring test, such as temperature monitoring test 926.

Since temperature may affect the lock frequency of the PLL, in some embodiments, method 2500 is performed before tests that may increase the temperature of the radar sensor IC. For example, in some embodiments, method 2500 may be performed before current consumption test 908 and before any intentional heat-up test (e.g., 928).

Figure 26:
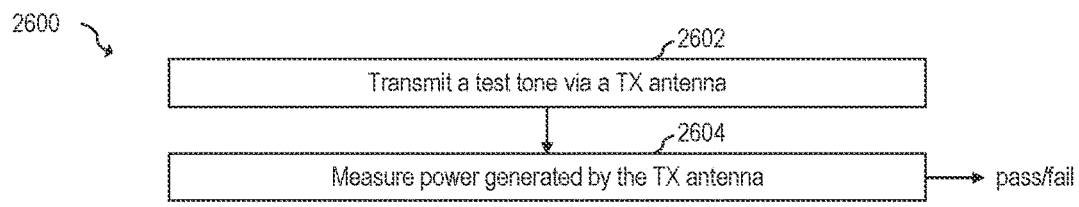
FIG. 26 shows a flow chart of an embodiment method for performing a transmitter power test, according to an embodiment of the present invention.

FIG. 26 shows a flow chart of embodiment method 2600 for performing a transmitter power test, according to an embodiment of the present invention. Transmitter power test 916 may be implemented as method 2600.

In some embodiments, method 2600 may be implemented in production mode and/or in reliability mode.

During step 2602, a test tone is transmitted by a transmitter circuit (e.g., amplifier 137) via a transmitting antenna (e.g., antenna 114).

During step 2604, the power generated by the transmitting antenna is determined. For example, in some embodiments, a power sensor installed directly on millimeter-wave radar sensor IC 202 or an interface board (e.g., 408, 608) is used to measure the power radiated by the transmitting antenna. If the determined power is within a target range (e.g., within +/−2 dB of a target power), then the test is considered a pass. Otherwise, the test is considered a fail.

In some embodiments, method 2600 is performed for a plurality of frequency points (e.g., for chirps starting at 58 GHz, 60 GHz, and 63 GHz).

Figure 27:
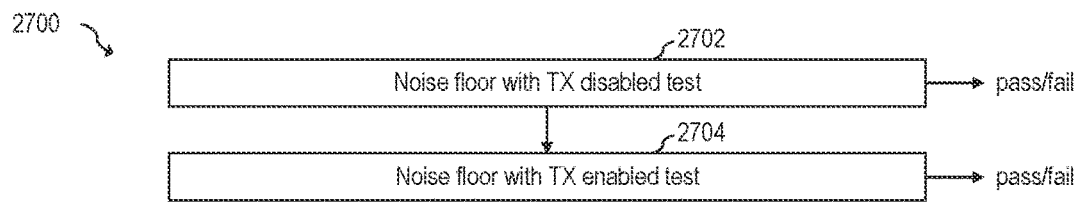
FIGS. 27-29 show flow charts of embodiment methods for performing receiver noise floor tests, according to embodiments of the present invention.

FIG. 27 shows a flow chart of embodiment method 2700 for performing a receiver noise floor test, according to an embodiment of the present invention. Receiver noise floor test 918 may be implemented as method 2700.

In some embodiments, method 2700 may be implemented in production mode and/or in reliability mode.

In some embodiments, method 2700 checks the noise floor associated with IF signals $x_{IF}(t)$ after digitalization at the output of an ADC (e.g., ADC 112), which may be affected by noise floor levels of circuits between a mixer (e.g., mixer 146) and the ADC.

As shown in FIG. 27, method 2700 includes noise floor with transmitter disabled test 2702, and noise floor with transmitter enabled test 2704. The noise floor test with transmitter disabled (2702) is configured to measure the aggregated noise floor associated with the baseband circuit (e.g., 206) and the ADC noise floor. The noise floor test with transmitter disabled (2704) is configured to measure the aggregated noise floor associated with the RF mixer (e.g., 146), baseband circuit, and the ADC noise floor.

Figure 28:
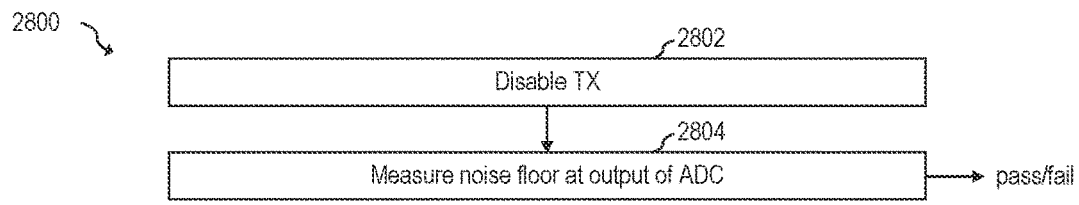

FIG. 28 shows a flow chart of embodiment method 2800 for performing a receiver noise floor test with the transmitter disabled, according to an embodiment of the present invention. Noise floor with transmitter disabled test 2702 may be implemented as method 2800.

During step 2802, the transmitter circuit is disabled. For example, in some embodiments, disabling the transmitter includes turning off or setting to an inactive mode one or more (or all) of PLL circuits (e.g., 134, 136, 138, 140) and/or amplifier (e.g., 137).

During step 2804, the ADC (e.g., ADC 112) samples the signal at its input and the noise floor associated with the samples captured by the ADC is measured/determined in a known manner (e.g., based on the power of the signal sampled). If the noise floor is above a predetermined threshold, the test is considered a fail. Otherwise, it is considered a pass.

In some embodiments, averaging is performed during step 2804. For example, in some embodiments, 10 noise floor measurements are performed during step 2804, and the average is used for determined whether the test passed or failed. A different number of noise floor measurements may be used, such as 9, 8, or lower, or 50, 100, 1000, or higher.

The higher the number of noise floor measurements, the lower the variations, but the longer the test time. For example, in some embodiments, a single measurement (e.g., a single acquisition, with 1024 samples per acquisition, and a sample rate of 2 MHz) may have a 6-sigma value between 1.5 dB and 3 dB and a test time of about 70 ms; 10 iterations (10 noise floor measurements) may have a 6-sigma value between 0.45 dB and 0.55 dB and a test time of about 250 ms; 100 iterations may have a 6-sigma value between 0.1 dB and 0.25 dB and a test time of about 2 s; and 1000 iterations may have a 6-sigma value between 0.05 dB and 0.1 dB and a test time of about 20 s. In some embodiments, a number, such as 10, may be used during production testing as a compromised variations and test time. A higher number, such as 100, may be used in reliability mode for evaluation purposes.

In some embodiments, a different number of samples per acquisition (e.g., 512, 256, 2048, etc.) and a different sampling frequency (e.g., 1 MHz, 4 MHz, etc.) may also be used.

In some embodiments, a post processing of sampling data is performed during step 2804. For example, in some embodiments, a high pass filter with a cutoff frequency between 0 Hz and half the ADC sampling rate (e.g., an 80 kHz cutoff frequency) may be used prior to determining the noise floor during step 2804.

Figure 29:
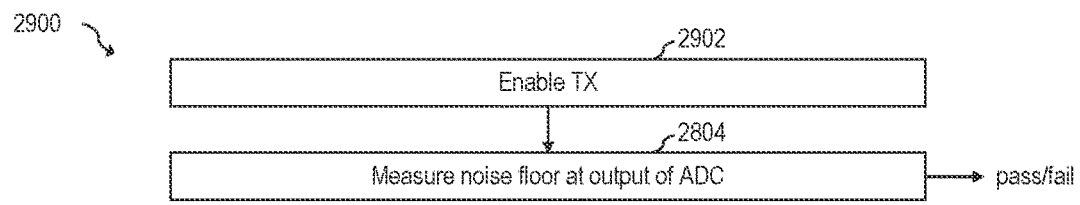

FIG. 29 shows a flow chart of embodiment method 2900 for performing a receiver noise floor test with the transmitter enabled, according to an embodiment of the present invention. Noise floor with transmitter enabled test 2704 may be implemented as method 2900.

Method 2900 includes steps 2902 and 2804. Step 2804 may be performed in a similar manner as in method 2800.

During step 2902, the transmitter circuit is enabled. For example, in some embodiments, enabling the transmitter includes turning on and in active mode the PLL circuits (e.g., 134, 136, 138, 140) and amplifier (e.g., 137). For example, in some embodiments, radar signals, such as chirps, are transmitted during step 2902.

In some embodiments, method 2900 is performed for various radar settings. For example, in some embodiments, method 3000 is performed for multiple chirp start frequencies (e.g., between 58 GHz and 63 GHz), different transmitter output power settings, and for different radar modes (e.g., idle, deep-sleep, etc.).

In some embodiments, method 2900 is only performed during reliability mode.

Figure 30:
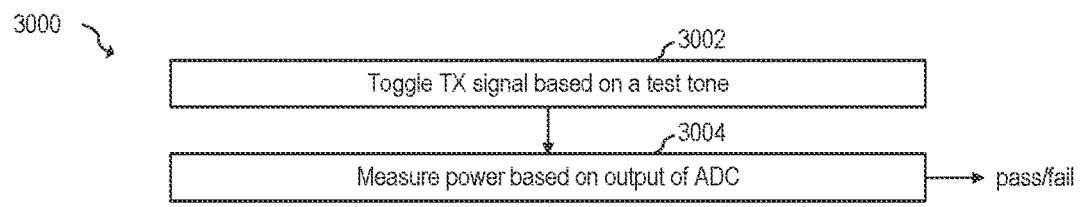
FIG. 30 shows a flow chart of an embodiment method for performing a transmitter-receiver coupling test, according to an embodiment of the present invention.

FIG. 30 shows a flow chart of embodiment method 3000 for performing a transmitter-receiver coupling test, according to an embodiment of the present invention. Transmitter-receiver coupling test 920 may be implemented as method 3000.

In some embodiments, method 3000 may be implemented in production mode and/or in reliability mode.

In some embodiments, method 3000 allows for investigating coupling between a transmitting antenna (e.g., 114) and a receiving antenna (e.g., 116).

In some embodiments, method 3000 is performed without using external RF equipment. For example, in some embodiments, the generation and measurement of RF signals is performed, e.g., by a millimeter-wave radar sensor IC, such as millimeter-wave radar sensor IC 202.

During step 3002, signals transmitted by a transmitting antenna (e.g., antenna 114) are modulated based on a test tone (also referred to as a test signal). For example, in some embodiments, transmitted radar signals, such as chirps, are modulated by toggling the transmitted radar signals (e.g., on and off) based on the test tone. In some embodiments, the toggling of the radar signals transmitted by the transmitting antenna is achieved by turning on and off an amplifier (e.g., 137) based on the test tone (e.g., to turn on and off the carrier signal). In some embodiments, the toggling of the signals transmitted by the transmitting antenna is achieved by turning on and off the transmitted signal power controlled by a digital-to-analog converter (DAC) that is in series with the amplifier (e.g., as can be seen from FIG. 31).

In some embodiments, the test tone has a frequency lower than 500 kHz. For example, in some embodiments, the test tone is a square wave at 400 kHz. A different test tone waveform and/or a test tone with a different frequency (e.g., 250 kHz, 450 kHz, etc.) may also be used.

In some embodiments, the signals transmitted by the transmitting antenna are chirps, e.g., with chirp start frequencies between 58 GHz and 63 GHz. In some embodiments, other start frequencies and/or other radar signals may also be used.

During step 3004, data from the transmitting antenna is compared with data from the receiving antenna to determine transmitter-receiver coupling. For example, in some embodiments, the power at the output of an ADC (e.g., ADC 112) is measured for a receiving antenna (e.g., 116) and compared with the power transmitted during step 3002 (which may be known, e.g., by design, or may be otherwise determined). If the measured power compared to the transmitted power is below a predetermined threshold, the test is considered a pass. Otherwise, the test is considered a fail. For example, in some embodiments, if the measured power is below −15 dB when compared with the transmitted power, the test is considered a pass. Otherwise is considered a fail. Other thresholds, such as −18 dB, for example, may also be used.

In some embodiments, method 3000 may be performed for a plurality of receiving antennas (e.g., two, three, or more receiving antennas of a radar module). In some embodiments, step 3004 comprises comparing data between a first and a second receiving antenna to determine, e.g., differences in coupling between the transmitting antenna and each of the receiving antennas and/or determining coupling between receiving antennas. In some embodiments, the comparison between data from the first and second receiving antennas is performed, instead of or in addition to, comparing the data of the first and/or second receiving antenna with data from the transmitting antenna.

In some embodiments, methods 3000 may be performed a plurality of times with different radar settings (e.g., different gains for amplifiers 137 and/or 145, different chirp start frequencies, etc.).

Figure 31:
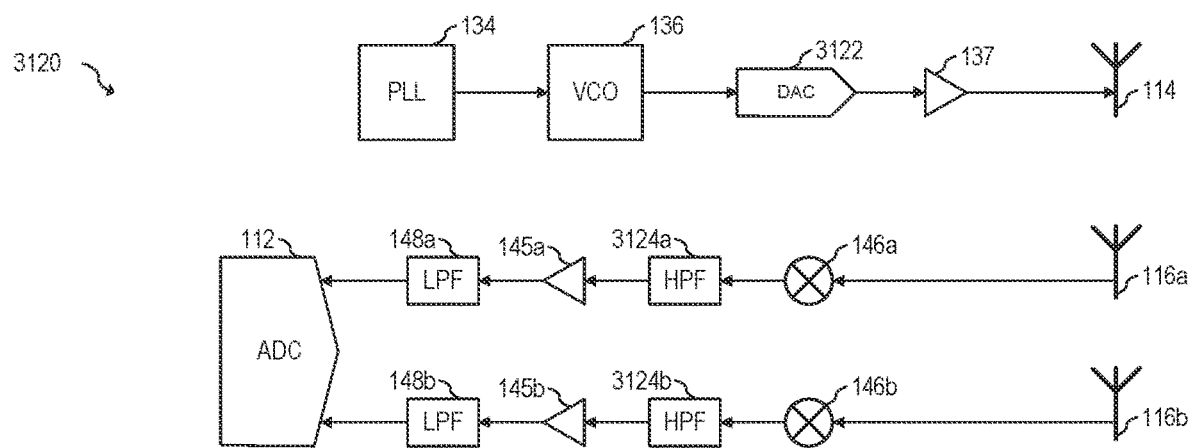
FIG. 31 shows a portion of a millimeter-wave radar system, according to an embodiment of the present invention.

FIG. 31 shows a portion of millimeter-wave radar system 3120, according to an embodiment of the present invention. Millimeter-wave radar system 3120 is a possible implementation of millimeter-wave radar system 100, and which may be implemented in a radar module with a plurality of ICs (e.g., in a similar manner as radar module 200).

As shown in FIG. 31, a transmitter circuit may include DAC 3122 and a receiver circuit may include two receiving paths coupled to respective receiving antennas 116*a* and 116*b*. With respect to millimeter-wave system 3120, the toggling of the transmitting signal during step 3002 may be implemented, e.g., by toggling on and off DAC 3122 or by toggling on and off amplifier 137 based on a test tone.

Figure 32:
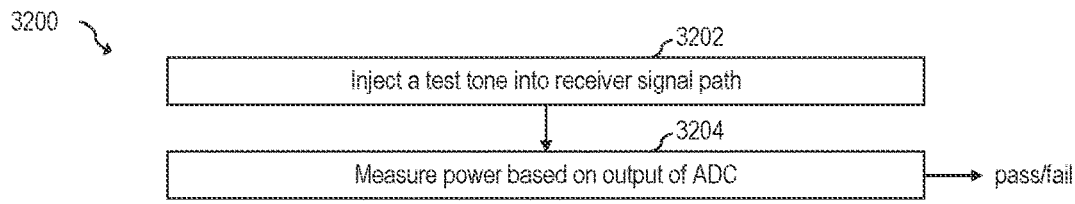
FIG. 32 shows a flow chart of an embodiment method for performing a receiver gain test, according to an embodiment of the present invention.

FIG. 32 shows a flow chart of embodiment method 3200 for performing a receiver gain test, according to an embodiment of the present invention. Receiver gain test 922 may be implemented as method 3200.

In some embodiments, method 3200 may be implemented in production mode and/or in reliability mode.

In some embodiments, method 3200 is performed without using external RF equipment. For example, in some embodiments, the generation and measurement of RF signals is performed, e.g., by a millimeter-wave radar sensor IC, such as millimeter-wave radar sensor IC 202.

During step 3202, a test controller, such as controller 404, 604 or 704), injects a test tone into an output of a mixer (e.g., mixer 146). For example, in some embodiments, a 200 kHz sinewave is injected at an output of a mixer (e.g., mixer 146). Other frequencies (e.g., 250 kHz or higher, such as 400 kHz) and waveforms other than sinewaves (e.g., sawtooth wave) may also be used. In embodiments in which the mixer includes a gain stage, the test tone may be injected at the input of the gain stage of the mixer. In some embodiments, the test tone may be injected by modulating radar signals transmitted by a transmitting antenna (e.g., in a similar manner as in step 3002).

During step 3204, an ADC, such as ADC 112, samples the test tone, and the power of the sampled signal is estimated. If the (e.g., peak or mean) power is within a target (e.g., peak or mean) power range based on the configured receiver gain (e.g., +/−2 dB of expected peak or mean power), the test is considered a pass. Otherwise, the test is considered a fail.

In some embodiments, method 3200 is performed for a plurality receiver gain settings and/or a plurality of chirp start frequencies, and/or other radar settings.

Figure 33:
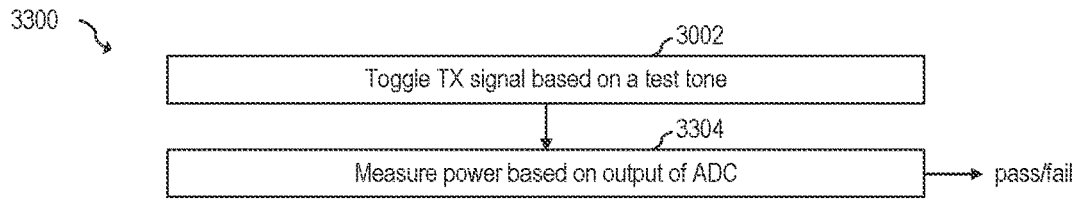
FIG. 33 shows a flow chart of an embodiment method for performing a transmitter-receiving coupling test and receiver gain test, according to an embodiment of the present invention.

In some embodiments, some of the steps of methods 3000 and 3200 may be shared. For example, FIG. 33 shows a flow chart of embodiment method 3300 for performing a transmitter-receiving coupling test and receiver gain test, according to an embodiment of the present invention. During step 3304, in addition to measuring the power based on the output of the ADC, determinations of the transmitter-receiver coupling (e.g., as described with respect to step 3004) and receiver gain (e.g., as described with respect to step 3204) are performed. If the transmitter-receiver coupling is within expected limits and the receiver gain is within expected limits, the test is considered a pass. Otherwise, the test is considered a fail.

Figure 34:
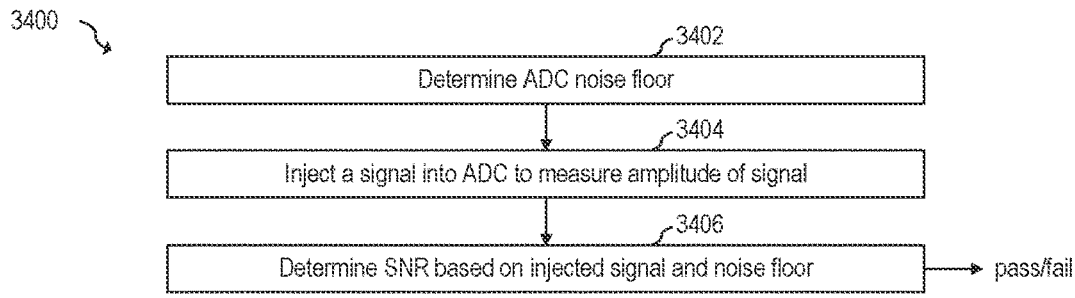
FIG. 34 shows a flow chart of an embodiment method for performing an ADC signal-to-noise ratio (SNR) test, according to an embodiment of the present invention.

FIG. 34 shows a flow chart of embodiment method 3400 for performing an ADC SNR test, according to an embodiment of the present invention. ADC SNR test 924 may be implemented as method 3400.

In some embodiments, method 3400 may be implemented in production mode and/or in reliability mode.

During step 3402, the noise floor of an ADC, such as ADC 112, is determined. In some embodiments, the noise floor of the ADC is determined by performing method 2800. In some embodiments, the inputs of the ADC are disconnected from the receiver path prior to performing step 2804 (e.g., when performing method 2800 for determining ADC noise floor).

In some embodiments, a noise floor of a receiver path that includes the ADC is determined during step 3402 instead of the noise floor of the ADC. For example, in some embodiments, the noise floor determined during step 3402 is determined by performing method 2800 or 2900. Other noise floor measures may be used.

During step 3404, a signal is injected into the ADC. In some embodiments, the signal is injected into the ADC directly at an input of the ADC to determine the signal power. In some embodiments, the signal is injected at a node of the receiver path, such as at the output of a mixer (e.g., mixer 146).

During step 3406, an SNR value is determined, e.g., by dividing the signal power (from step 3404) over the noise floor (from step 3402). If the SNR is higher than a predetermined threshold (e.g., higher than 60 dB), the test is considered a pass. Otherwise, the test is considered a fail.

In some embodiments, method 3400 is performed for each input of the ADC, and/or for a plurality of temperatures, such as for −40° C., 5° C., 45° C., 65° C., and 95° C.

Figure 35:
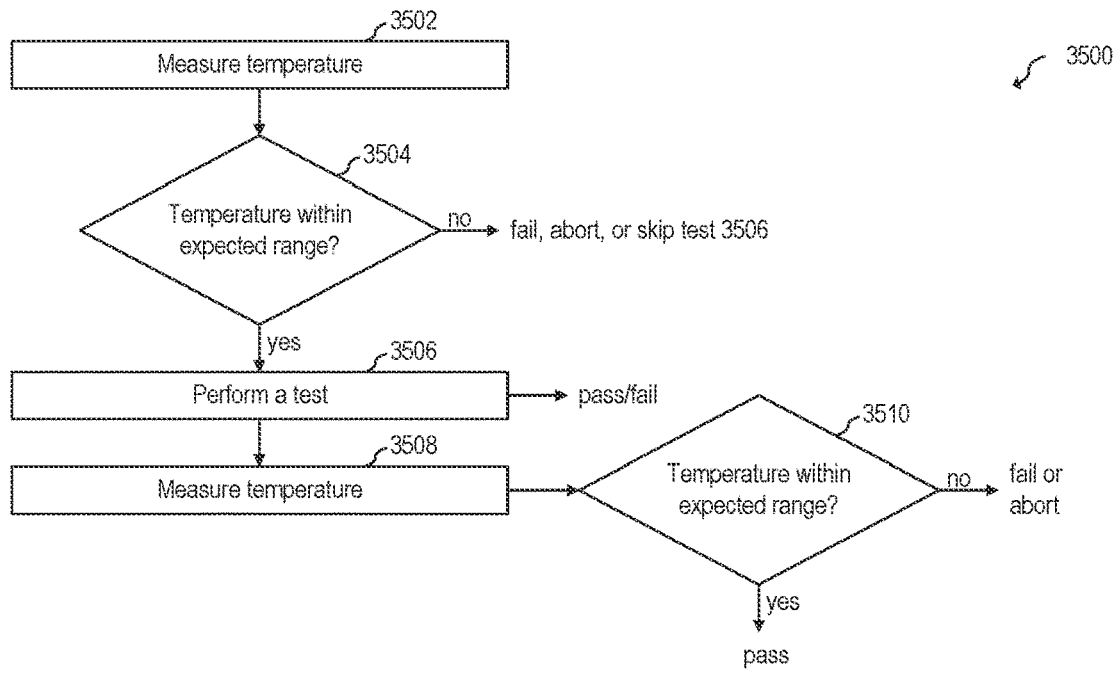
FIG. 35 shows a flow chart of an embodiment method for performing a temperature monitoring test, according to an embodiment of the present invention.

FIG. 35 shows a flow chart of embodiment method 3500 for performing a temperature monitoring test, according to an embodiment of the present invention. Temperature monitoring test 926 may be implemented as method 3500.

In some embodiments, method 3500 may be implemented in production mode and/or in reliability mode.

During step 3502, the temperature of one or more ICs of a radar module, such as a millimeter-wave radar sensor IC (e.g., 202), is measured in a known manner (e.g., using a temperature sensor of the IC, such as a temperature sensor based on a diode of the IC). If the temperature is within an expected temperature range (e.g., between 15° C. and 35° C. for a test intended to be performed at room temperature), step 3506 is performed. Otherwise, step 3506 may be skipped, the entire test sequence may be aborted, or the temperature monitoring test may be considered a fail.

During step 3506, one or more tests may be performed. For example, in some embodiments, any of tests 902, 904, 906, 908, 910, 912, 914, 916, 918, 920, 922, and/or 924, or a combination thereof may be performed during step 3506.

During step 3508, the temperature of one or more ICs of a radar module is measured in a known manner. If the temperature is within an expected temperature range (e.g., between 15° C. and 35° C. for a test performed at room temperature), the test is considered a pass. Otherwise, the test may be considered a fail.

In some embodiments, the expected temperature range may be hotter than the temperature before the test was performed. For example, a current consumption test may be expected to produce an increase in temperature of the IC, and the expected temperature range may reflect such expectation (e.g., between 25° C. and 45° C. for a test performed at room temperature). As another example, a test may deliberately increase the temperature of the IC (e.g., such as method by method 3600), and steps 3508 and 3510 may be used to determine whether such increase in temperature was achieved.

In some embodiments, e.g., as shown in FIG. 35, steps 3502/3504 and 3508/3510 are performed. In some embodiments, steps 3502 and 3504 are omitted and the temperature is only checked after step 3506 is performed. In some embodiments, steps 3508 and 3510 are omitted and the temperature is checked only prior to step 3506.

In some embodiments, method 3500 is performed a plurality of times while executing a test sequence. For example, in some embodiments, one or more times, method 3500 may be performed without omitting steps 3502/3504 or 3508/3510, one or more times method 3500 may be performed while omitting steps 3502/3504 and not 3508/3510, and one or more times, method 3500 may be performed while omitting step 3508/3510 and not 3502/3504.

Figure 36:
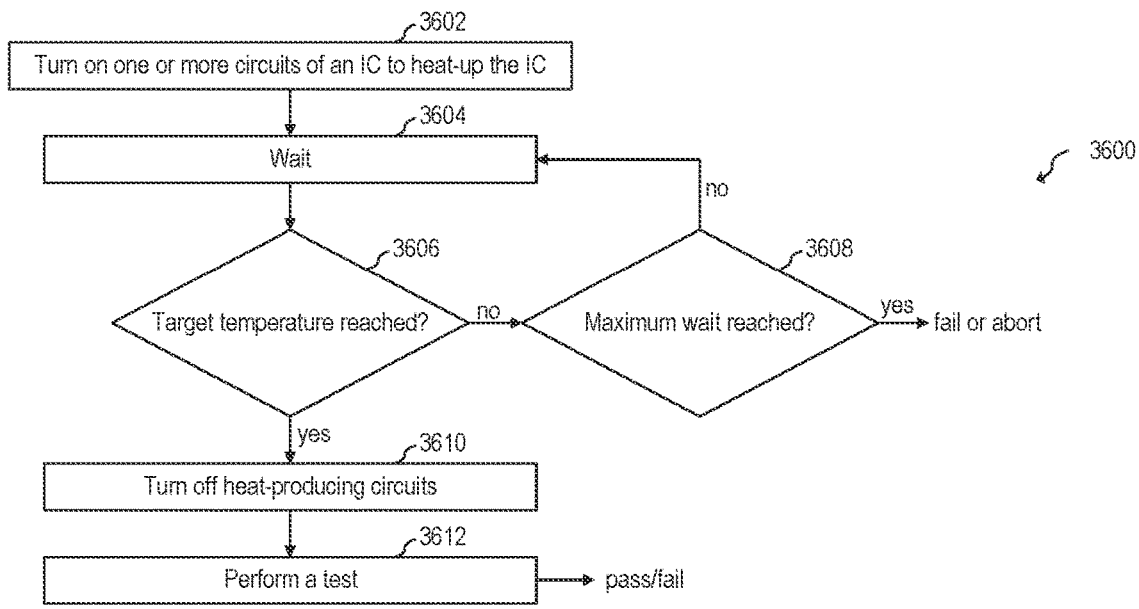
FIG. 36 shows a flow chart of an embodiment method for performing a heat up mode for stress test, according to an embodiment of the present invention.

FIG. 36 shows a flow chart of embodiment method 3600 for performing a heat up mode for stress test, according to an embodiment of the present invention. Heat up mode for stress test 928 may be implemented as method 3600.

During step 3602, a millimeter-wave radar sensor IC, such as millimeter-wave radar sensor IC 202, is configured so that it produces heat to increase the temperature of the millimeter-wave radar sensor IC. For example, in some embodiments, the millimeter-wave radar sensor IC is configured in constant wave (CW) mode at maximum transmitting power. In some embodiments, other circuit may be turned on, additionally or alternatively, to increase the temperature of the millimeter-wave radar sensor IC.

As shown by steps 3604, 3606, 3608, and 3610, the heat-producing circuits activated during step 3602 remain on until a target temperature is reached (e.g., 55° C.), or until a timeout (e.g., 20 s) is reached. If the target temperature is reached, then the heat-producing circuits are turned off and a test is performed during step 3612. Otherwise the heatmode is considered a fail.

In some embodiments, the test performed during step 3612 may any of tests 902, 904, 906, 908, 910, 912, 914, 916, 918, 920, 922, and/or 924, or a combination thereof.

Figure 37:
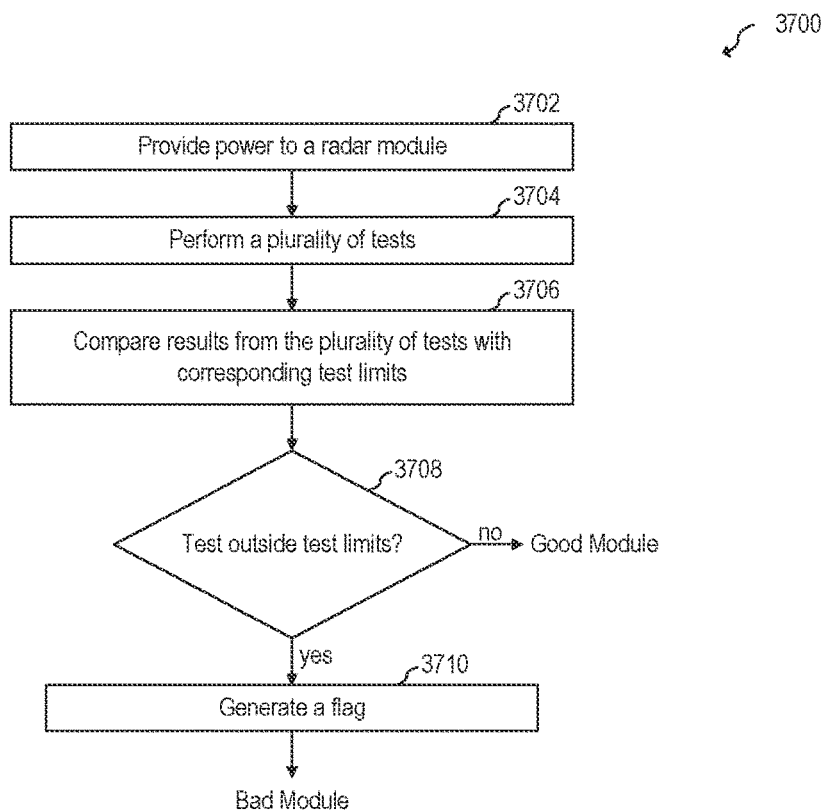
FIG. 37 shows a flow chart of an embodiment method for performing a test sequence in production mode, according to an embodiment of the present invention.

FIG. 37 shows a flow chart of embodiment method 3700 for performing a test sequence in production mode, according to an embodiment of the present invention. Method 3700 may be performed, e.g., using systems 400, 600, or 700.

During step 3702, power is provided to a radar module, such as radar module 200. For example, in some embodiments, a predefined voltage rail (e.g., 12 V) is provided to the radar module, and voltage regulator(s) of the radar module (e.g., 208) produce one or more supply rails (e.g., a 1.8 V rail, and a 3.3 V rail) for providing power to the ICs of the radar module. In some embodiments, a plurality of voltage levels are provided to the radar module from an external source, such as from an interface board (e.g., 408, 608), and/or from a test controller board (e.g., 404).

In some embodiments, all ICs of the radar module were previously tested (e.g., by their respective IC manufacturers) and passed all of their respective production tests.

During step 3704, a plurality of tests is performed on the radar module. For example, in some embodiments, a set of tests, such as a test sequence (e.g., 300, 900), is performed on the radar module.

During step 3706, results from the set of tests are compared with corresponding test limits to determine whether the radar module has functional faults and/or whether parametric performance satisfy the radar module requirements (e.g., as reflected in a radar module specification sheet). In some embodiments, the result comparisons are performed entirely inside the radar module, e.g., such as inside a test controller of the radar module, such as test controller 704. In other embodiments, some or all of the result comparisons are performed outside of the radar module, such as inside a test controller outside the radar module (e.g., 404, 604) or by a host PC (e.g., 402).

If during step 3708 it is determined that all tests of the set of tests passed (are within expected test limits), the radar module is categorized as a Good Module. Otherwise, a flag is generated during step 3710 and the radar module is categorized as a Bad Module.

In some embodiments, generating a flag comprises asserting a bit of a register map of the radar module (such as a register map of a radar sensor IC, such as radar sensor IC 202 or of a processor IC, such as processor IC 204, or of a test controller, such as test controller 404, 604, 704). In some embodiments, generating the flag comprises asserting a signal in an interrupt pin (e.g., IRQ) of the radar module, such as an interrupt pin of the radar sensor IC and/or of the processor IC, and/or of the test controller. In some embodiments, generating the flag comprises generating the flag digitally inside a host PC, such as host PC 402.

Example embodiments of the present invention are summarized here. Other embodiments can also be understood from the entirety of the specification and the claims filed herein.

Example 1. A method for testing a millimeter-wave radar module, the method including: providing power to the millimeter-wave radar module, the millimeter-wave radar module including a printed circuit board (PCB), a millimeter-wave radar sensor coupled to the PCB, and a controller for radar signal processing, the controller coupled to the millimeter-wave radar sensor via the PCB; performing a plurality of tests indicative of a performance level of the millimeter-wave radar module; comparing respective results from the plurality of tests with corresponding test limits; and generating a flag when a result from a test of the plurality of test is outside the corresponding test limits, where performing the plurality of tests includes: transmitting a signal with a transmitting antenna coupled to the millimeter-wave radar sensor, modulating the transmitted signal with a test signal, and capturing first data from a first receiving antenna using an analog-to-digital converter of the millimeter-wave radar sensor, where generating the flag includes generating the flag based on the captured first data.

Example 2. The method of example 1, where performing the plurality of tests includes: heating up the millimeter-wave radar sensor by turning on a plurality of internal circuits of the millimeter-wave radar sensor; and performing a further test of the plurality of tests after heating up the millimeter-wave radar sensor.

Example 3. The method of one of examples 1 or 2, where heating up the millimeter-wave radar sensor includes turning on the plurality of internal circuits of the millimeter-wave radar sensor for a predetermined amount of time.

Example 4. The method of one of examples 1 to 3, where heating up the millimeter-wave radar sensor includes stop heating up the millimeter-wave radar sensor after a temperature of the millimeter-wave radar sensor reaches a predetermined temperature.

Example 5. The method of one of examples 1 to 4, where performing the further test after heating up the millimeter-wave radar sensor includes: capturing first and second chirps with the millimeter-wave radar sensor; and comparing the first captured chirp with the second captured chirp, where generating the flag includes generating the flag when an amplitude difference between a first amplitude of the first chirp and a second amplitude of the second chirp is higher than a predetermined amplitude threshold.

Example 6. The method of one of examples 1 to 5, where performing the plurality of tests includes: capturing a chirp with first, second, and third receiving antennas coupled to the millimeter-wave radar sensor to generate first, second and third captured chirps, respectively; and determining an amplitude error between amplitudes of the first, second, and third captured chirps, where generating the flag includes generating the flag when the amplitude error is higher than a predetermined amplitude threshold.

Example 7. The method of one of examples 1 to 6, where the chirp has a given start frequency, the method further including determining the given start frequency by: transmitting a first chirp; capturing a first chirp with the first, second, and third receiving antennas; determining a first amplitude error based on the captured first chirp; transmitting a second chirp with a different start frequency from the transmitted first chirp; capturing a second chirp with the first, second, and third receiving antennas; determining a second amplitude error based on the captured second chirp; and determining the given start frequency based on the first and second amplitude errors.

Example 8. The method of one of examples 1 to 7, where performing the plurality of tests includes: operating a phase-locked loop (PLL) of the millimeter-wave radar sensor; setting a status register when the PLL is not locked; and performing a plurality of reads of the status register during a predetermined amount of time to determine a PLL status, where generating the flag includes generating the flag when the plurality of reads is indicative that the status register was set at least once during the predetermined amount of time.

Example 9. The method of one of examples 1 to 8, further including heating up the millimeter-wave radar sensor before performing the plurality of reads of the status register to determine the PLL status.

Example 10. The method of one of examples 1 to 9, where performing the plurality of tests includes: capturing a chirp using the analog-to-digital converter of the millimeter-wave radar sensor; and determining a number of saturated samples in a plurality of samples of the captured chirp, where generating the flag includes generating the flag based on the number of saturated samples.

Example 11. The method of one of examples 1 to 10, where performing the plurality of tests includes: determining a receiver noise floor based on an output of the analog-to-digital converter of the millimeter-wave radar sensor when a transmitter circuit of the millimeter-wave radar sensor is enabled; injecting a test signal between a mixer of the millimeter-wave radar sensor and the analog-to-digital converter; determining an amplitude of the injected test signal with the analog-to-digital converter; and determining a signal-to-noise ratio (SNR) based on the determined amplitude and the determined receiver noise floor, where generating the flag includes generating the flag when the determined SNR is lower than a predetermined SNR threshold.

Example 12. The method of one of examples 1 to 11, where performing the plurality of tests includes: injecting a test signal between a mixer of the millimeter-wave radar sensor and the analog-to-digital converter of the millimeter-wave radar sensor; and determining an amplitude of the injected test signal with the analog-to-digital converter, where generating the flag includes generating the flag based on the determined amplitude.

Example 13. The method of one of examples 1 to 12, further including capturing second data from a second receiving antenna using the analog-to-digital converter, where generating the flag includes generating the flag based on the captured first and second data.

Example 14. The method of one of examples 1 to 13, where the test signal has a base frequency lower than 500 kHz.

Example 15. The method of one of examples 1 to 14, where the millimeter-wave radar sensor is soldered to the PCB.

Example 16. A millimeter-wave radar module testing system including: a millimeter-wave radar module including a printed circuit board (PCB), and a millimeter-wave radar sensor coupled to the PCB; and a controller coupled to the millimeter-wave radar sensor via the PCB, the controller configured to: perform a plurality of tests indicative of a performance level of the millimeter-wave radar module; compare respective results from the plurality of tests with corresponding test limits; and generate a flag when a result from a test of the plurality of test is outside the corresponding test limits, where performing the plurality of tests includes: transmitting a signal with a transmitting antenna coupled to the millimeter-wave radar sensor, modulating the transmitted signal with a test signal, and capturing first data from a first receiving antenna using an analog-to-digital converter of the millimeter-wave radar sensor, where generating the flag includes generating the flag based on the captured first data.

Example 17. The millimeter-wave radar module testing system of example 16, where the controller and the millimeter-wave radar sensor are soldered to the PCB.

Example 18. The millimeter-wave radar module testing system of one of examples 16 or 17, where the controller is coupled to the PCB via a communication interface.

Example 19. A millimeter-wave radar module including: a printed circuit board (PCB); a millimeter-wave radar sensor integrated circuit (IC) coupled to the PCB; a switching power converter IC coupled to the millimeter-wave radar sensor IC via the PCB; and a test controller coupled to the millimeter-wave radar sensor IC via the PCB, the test controller configured to: perform a plurality of tests indicative of a performance level of the millimeter-wave radar module; compare respective results from the plurality of tests with corresponding test limits; and generate a flag when a result from a test of the plurality of test is outside the corresponding test limits, where performing the plurality of tests includes: transmitting a signal with a transmitting antenna coupled to the millimeter-wave radar sensor IC, modulating the transmitted signal with a test signal, and capturing first data from a first receiving antenna using an analog-to-digital converter of the millimeter-wave radar module, where generating the flag includes generating the flag based on the captured first data.

Example 20. The millimeter-wave radar module of example 19, further including a processor IC coupled to the millimeter-wave radar sensor IC via the PCB, the processor IC including the analog-to-digital converter and the test controller.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for testing a millimeter-wave radar module, the method comprising:
providing power to the millimeter-wave radar module, the millimeter-wave radar module comprising a printed circuit board (PCB), a millimeter-wave radar sensor coupled to the PCB, and a controller for radar signal processing, the controller coupled to the millimeter-wave radar sensor via the PCB;
performing a plurality of tests indicative of a performance level of the millimeter-wave radar module;
comparing respective results from the plurality of tests with corresponding test limits; and
generating a flag when a result from a test of the plurality of test is outside the corresponding test limits, wherein performing the plurality of tests comprises:
transmitting a signal with a transmitting antenna coupled to the millimeter-wave radar sensor,
modulating the transmitted signal with a test signal, and
capturing first data from a first receiving antenna using an analog-to-digital converter of the millimeter-wave radar sensor, wherein generating the flag comprises generating the flag based on the captured first data.

2. The method of claim 1, wherein performing the plurality of tests comprises:
heating up the millimeter-wave radar sensor by turning on a plurality of internal circuits of the millimeter-wave radar sensor; and
performing a further test of the plurality of tests after heating up the millimeter-wave radar sensor.

3. The method of claim 2, wherein heating up the millimeter-wave radar sensor comprises turning on the plurality of internal circuits of the millimeter-wave radar sensor for a predetermined amount of time.

4. The method of claim 2, wherein heating up the millimeter-wave radar sensor comprises stop heating up the millimeter-wave radar sensor after a temperature of the millimeter-wave radar sensor reaches a predetermined temperature.

5. The method of claim 2, wherein performing the further test after heating up the millimeter-wave radar sensor comprises:
capturing first and second chirps with the millimeter-wave radar sensor; and
comparing the first captured chirp with the second captured chirp, wherein generating the flag comprises generating the flag when an amplitude difference between a first amplitude of the first chirp and a second amplitude of the second chirp is higher than a predetermined amplitude threshold.

6. The method of claim 1, wherein performing the plurality of tests comprises:
capturing a chirp with the first receiving antenna, a second receiving antenna, and a third receiving antenna coupled to the millimeter-wave radar sensor to generate first, second and third captured chirps, respectively; and
determining an amplitude error between amplitudes of the first, second, and third captured chirps, wherein generating the flag comprises generating the flag when the amplitude error is higher than a predetermined amplitude threshold.

7. The method of claim 6, wherein the chirp has a given start frequency, the method further comprising determining the given start frequency by:
transmitting a first chirp;
capturing the first chirp with the first, second, and third receiving antennas;
determining a first amplitude error based on the captured first chirp;

transmitting a second chirp with a different start frequency from the transmitted first chirp;
capturing the second chirp with the first, second, and third receiving antennas;
determining a second amplitude error based on the captured second chirp; and
determining the given start frequency based on the first and second amplitude errors.

8. The method of claim 1, wherein performing the plurality of tests comprises:
operating a phase-locked loop (PLL) of the millimeter-wave radar sensor;
setting a status register when the PLL is not locked; and
performing a plurality of reads of the status register during a predetermined amount of time to determine a PLL status, wherein generating the flag comprises generating the flag when the plurality of reads is indicative that the status register was set at least once during the predetermined amount of time.

9. The method of claim 8, further comprising heating up the millimeter-wave radar sensor before performing the plurality of reads of the status register to determine the PLL status.

10. The method of claim 1, wherein performing the plurality of tests comprises:
capturing a chirp using the analog-to-digital converter of the millimeter-wave radar sensor; and
determining a number of saturated samples in a plurality of samples of the captured chirp, wherein generating the flag comprises generating the flag based on the number of saturated samples.

11. The method of claim 1, wherein performing the plurality of tests comprises:
determining a receiver noise floor based on an output of the analog-to-digital converter of the millimeter-wave radar sensor when a transmitter circuit of the millimeter-wave radar sensor is enabled;
injecting a further test signal between a mixer of the millimeter-wave radar sensor and the analog-to-digital converter;
determining an amplitude of the injected further test signal with the analog-to-digital converter; and
determining a signal-to-noise ratio (SNR) based on the determined amplitude and the determined receiver noise floor, wherein generating the flag comprises generating the flag when the determined SNR is lower than a predetermined SNR threshold.

12. The method of claim 1, wherein performing the plurality of tests comprises:
injecting a further test signal between a mixer of the millimeter-wave radar sensor and the analog-to-digital converter of the millimeter-wave radar sensor; and
determining an amplitude of the injected further test signal with the analog-to-digital converter, wherein generating the flag comprises generating the flag based on the determined amplitude.

13. The method of claim 1, further comprising capturing second data from a second receiving antenna using the analog-to-digital converter, wherein generating the flag comprises generating the flag based on the captured first and second data.

14. The method of claim 1, wherein the test signal has a base frequency lower than 500 kHz.

15. The method of claim 1, wherein the millimeter-wave radar sensor is soldered to the PCB.

16. A millimeter-wave radar module testing system comprising:
a millimeter-wave radar module comprising a printed circuit board (PCB), and a millimeter-wave radar sensor coupled to the PCB; and
a controller coupled to the millimeter-wave radar sensor via the PCB, the controller configured to:
perform a plurality of tests indicative of a performance level of the millimeter-wave radar module;
compare respective results from the plurality of tests with corresponding test limits; and
generate a flag when a result from a test of the plurality of test is outside the corresponding test limits, wherein performing the plurality of tests comprises:
transmitting a signal with a transmitting antenna coupled to the millimeter-wave radar sensor,
modulating the transmitted signal with a test signal, and
capturing first data from a first receiving antenna using an analog-to-digital converter of the millimeter-wave radar sensor, wherein generating the flag comprises generating the flag based on the captured first data.

17. The millimeter-wave radar module testing system of claim 16, wherein the controller and the millimeter-wave radar sensor are soldered to the PCB.

18. The millimeter-wave radar module testing system of claim 16, wherein the controller is coupled to the PCB via a communication interface.

19. A millimeter-wave radar module comprising:
a printed circuit board (PCB);
a millimeter-wave radar sensor integrated circuit (IC) coupled to the PCB;
a switching power converter IC coupled to the millimeter-wave radar sensor IC via the PCB; and
a test controller coupled to the millimeter-wave radar sensor IC via the PCB, the test controller configured to:
perform a plurality of tests indicative of a performance level of the millimeter-wave radar module;
compare respective results from the plurality of tests with corresponding test limits; and
generate a flag when a result from a test of the plurality of test is outside the corresponding test limits, wherein performing the plurality of tests comprises:
transmitting a signal with a transmitting antenna coupled to the millimeter-wave radar sensor IC,
modulating the transmitted signal with a test signal, and
capturing first data from a first receiving antenna using an analog-to-digital converter of the millimeter-wave radar module, wherein generating the flag comprises generating the flag based on the captured first data.

20. The millimeter-wave radar module of claim 19, further comprising a processor IC coupled to the millimeter-wave radar sensor IC via the PCB, the processor IC comprising the analog-to-digital converter and the test controller.

* * * * *